(12) United States Patent
Beeler et al.

(10) Patent No.: US 10,818,038 B2
(45) Date of Patent: Oct. 27, 2020

(54) TECHNIQUES FOR CAPTURING DYNAMIC APPEARANCE OF SKIN

(71) Applicant: Disney Enterprises, Inc., Burbank, CA (US)

(72) Inventors: Thabo Beeler, Zürich (CH); Abhijeet Ghosh, Orpington (GB); Derek Bradley, Zürich (CH); Jeremy Riviere, Zürich (CH); Paulo F. Urnau Gotardo, Zürich (CH)

(73) Assignee: DISNEY ENTERPRISES, INC., Burbank, CA (US)

(*) Notice: Subject to any disclaimer, the term of this patent is extended or adjusted under 35 U.S.C. 154(b) by 44 days.

(21) Appl. No.: 16/211,152

(22) Filed: Dec. 5, 2018

(65) Prior Publication Data

US 2020/0082572 A1   Mar. 12, 2020

Related U.S. Application Data

(60) Provisional application No. 62/729,400, filed on Sep. 10, 2018.

(51) Int. Cl.
  *G06T 7/90* (2017.01)
  *G06T 15/50* (2011.01)
  *G06T 7/60* (2017.01)
  *G06T 7/00* (2017.01)
  *G06T 7/593* (2017.01)

(52) U.S. Cl.
  CPC .................. *G06T 7/90* (2017.01); *G06T 7/60* (2013.01); *G06T 7/97* (2017.01); *G06T 15/506* (2013.01)

(58) Field of Classification Search
  None
  See application file for complete search history.

(56) References Cited

U.S. PATENT DOCUMENTS

| 10,638,938 | B1* | 5/2020 | Tzvieli | G01J 5/0265 |
| 2012/0268571 | A1* | 10/2012 | Debevec | G06T 7/586 348/48 |
| 2015/0287187 | A1* | 10/2015 | Redtel | G06T 7/0016 382/128 |

(Continued)

OTHER PUBLICATIONS

Oliver Klehm, Fabrice Rousselle, Marios Paps, Derek Bradley, Christophe Hery, Bernd Bickel, Wojciech Jarosz, Thabo Beeler, Recent Advances in Facial Appearance Capture, 2015, Computer Graphics Forum, vol. 34, Issue 2, https://doi.org/10.1111/cgf.12594 (Year: 2015).*

(Continued)

*Primary Examiner* — Michael J Cobb
(74) *Attorney, Agent, or Firm* — Kilpatrick Towsend & Stockton LLP

(57) ABSTRACT

Embodiments of the present disclosure techniques for modeling and capturing the dynamic appearance of skin. These techniques can couple dynamic reflectance parameters for skin (albedo and specular reflectance) with dynamic geometry. The disclosed techniques allow for capture and modeling of the dynamic appearance of skin for an actor. The techniques can re-render the actor's face accurately to accurately model the appearance of skin including the albedo of skin that can change primarily due to blood flow. The techniques can also re-render the actor's face accurately under multiple different lighting conditions.

22 Claims, 16 Drawing Sheets

(56) References Cited

U.S. PATENT DOCUMENTS

2017/0094253 A1* 3/2017 Matthews .......... G06K 9/00255
2018/0042486 A1* 2/2018 Yoshizawa ........... A61B 5/4035
2018/0218200 A1* 8/2018 Wolf .................... G06K 9/2018

OTHER PUBLICATIONS

Tim Weyrich, Wojciech Matusik, Hanspeter Pfister, Bernd Bickel, Craig Donner, Chien Tu, Janet McAndless, Jinho Lee, Addy Ngan, Henrik Wann Jensen, Markus Gross, Analysis of Human Faces using a Measurement-Based Skin Reflectance Model, 2006, ACM Transactions on Graphics https://doi.org/10.1145/1141911. (Year: 2006).*

Tim Weyrich, Wojciech Matusik, Hanspeter Pfister, Addy Ngan, Markus Gross, Measuring Skin Reflectance and Subsurface Scattering, 2005, Mitsubishi Electric Research Laboratories, TR2005-046 (Year: 2005).*

\* cited by examiner

TECHNIQUES FOR CAPTURING DYNAMIC APPEARANCE OF SKIN

CROSS-REFERENCED TO RELATED APPLICATIONS

This application claims priority to U.S. Provisional Application Ser. No. 62/729,400, filed Sep. 10, 2018 and entitled "Animation Techniques for Dynamic Appearance of Skin," which is herein incorporated by reference in its entirety and for all purposes.

BACKGROUND

Creating and rendering realistic humans is becoming ever more important in computer graphics, with applications ranging from visual effects for entertainment, to educational and training scenarios, and even medical use cases. Digital humans pose a formidable challenge for animation techniques since their virtual appearance is comprised of many different components including shape, motion and material properties. In order to create a compelling and believable overall virtual character each of these components must be modeled realistically.

One of the most important challenges is to faithfully reproduce the way light interacts with skin, which can be characterized as appearance modeling. Early work has modeled skin appearance using static parameters for diffuse and specular reflectance, as described by a bidirectional reflectance distribution function (BRDF). General BRDF acquisition from human subjects is extremely challenging because the space can be highly-dimensional and hence would require dense sampling of incoming and outgoing light rays at every point on the surface, even without considering changes in surface and physiological state of the subject.

Static appearance capture falls short for creating convincing reproductions because, as skin shape changes over time, appearance does not remain static. Appearance also changes dynamically as a result of various factors, including changes in blood flow and in skin microstructure. While solely linear blendshapes have been used for modeling techniques, these liner blendshapes cannot faithfully represent the non-linear behavior of real skin deformation and blood flow influenced by physiological effects caused by heat or excitement. Consequently, just as researchers explore alternatives to linear blendshape models for representing the full complexity of dynamic skin, better models for dynamic skin appearance are also needed.

SUMMARY

Embodiments of the present disclosure can provide various systems, methods, and computer-readable medium for techniques for capturing and modeling the dynamic appearance of skin. The disclosed techniques can couple dynamic reflectance parameters for skin (diffuse and specular reflectance) with dynamic geometry. The disclosed techniques allow for capturing and modeling of the dynamic appearance of skin of an actor. The techniques can re-render the actor's face in way that accurately models the appearance of skin including the albedo of skin that can change primarily due to blood flow. The techniques can also re-render the actor's face under multiple environmental and lighting conditions that can differ from the conditions the images were captured. One potential use of these techniques is for computer animation, but these techniques are not solely limited to this use.

The techniques for acquiring dynamic properties of facial skin can include illuminating a face of a subject with a first known illumination. The techniques can capture multiple images of the face of an actor using two or more digital cameras. The digital cameras can be positioned to provide overlapping coverage of a patch of skin. The techniques can generate a three-dimensional geometry and texture maps of the patch of skin using the multiple images of the face. These techniques can produce high resolution texture maps. The techniques can obtain prior knowledge of skin color change due to blood flow. One or more time-varying parameter maps for rendering the face under multiple illumination conditions can be generated.

One of the time-varying maps can include an albedo map. The albedo map can depict a time-varying blood flow of the patch of skin including a shading free color of the face. One of the plurality of time-varying parameter maps can include a specular intensity map, where the specular intensity map can model light reflected off a surface of the patch of skin. One of the plurality of time-varying parameter maps can include a diffuse ambient occlusion map capturing residual diffuse shading that stems from inaccuracies in a base mesh not capturing wrinkle folds of the face. One of the plurality of time-varying parameter maps can include a normal map, where the normal map can capture geometric details of the patch of skin as the patch of skin stretches or compresses. The geometric details can include details caused by pores or fine wrinkles.

In various embodiments, the knowledge of skin color change due to blood flow can be obtained as follows. First, apply pressure firmly on the patch of skin. Next, release the pressure on the patch of skin. Next, capture a second plurality of images of the face of the subject using the plurality of cameras, the cameras having overlapping coverage of the patch of skin. Finally, compute a subject-specific blood flow line by aligning the second plurality of images of the patch of skin.

In various embodiments, the techniques for acquiring dynamic properties of facial skin can be stored as a plurality of instructions in a computer readable medium.

In various embodiments, the techniques for acquiring dynamic properties of facial skin can be performed by a system, including one or more memories, and one or more processors in communication with the one or more memories and configured to execute instructions stored in the one or more memories. The system can include one or more digital cameras and one or more light sources.

The following detailed description together with the accompanying drawings will provide a better understanding of the nature and advantages of the present disclosure.

DETAILED DESCRIPTION

Figure 1:
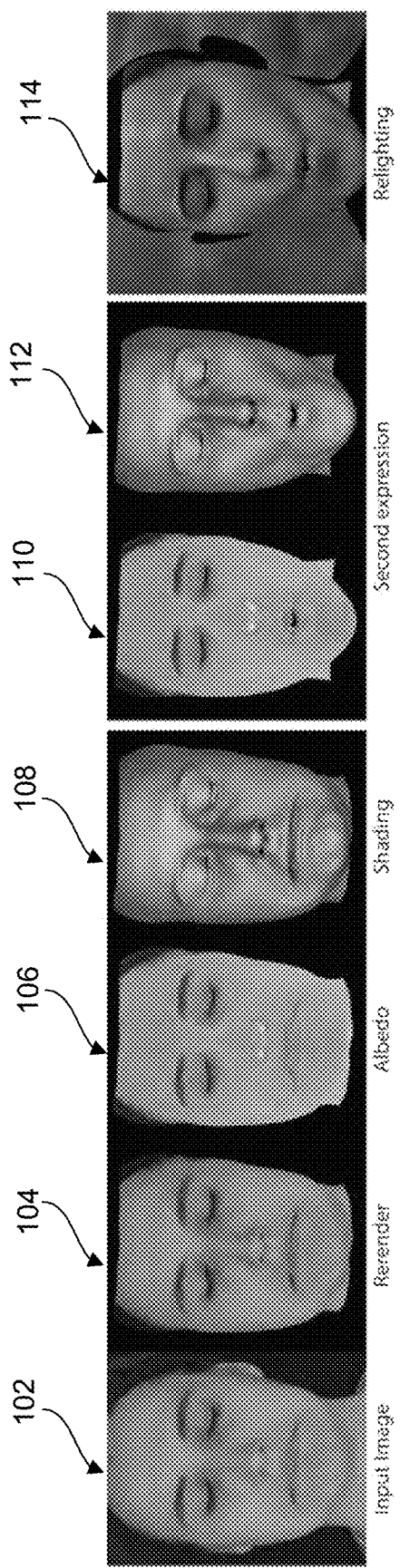
FIG. 1 illustrates an inverse rendering based approach to capture dynamic appearance properties of human skin, including per frame albedo, diffuse ambient occlusion, high-resolution normal images and specular intensity, at high fidelity from a passive multi-camera setup.

Certain embodiments of the present disclosure relate to systems, methods, and computer-readable medium for generating a comprehensive model for dynamic skin appearance that couples dynamic reflectance parameters for skin (albedo and specular reflectance) with dynamic geometry. The disclosed techniques provide a compact time-varying model of appearance and surface detail that can be estimated from multi-view image streams without requiring time-multiplexed illumination. The disclosed techniques employ a passive acquisition setup with few constraints on the appearance estimation. The techniques model the time-varying diffuse reflectance purely as a change in albedo and do not estimate any subsurface scattering parameters (e.g., translucency). The techniques also do not explicitly model any anisotropic skin reflectance changes caused by deformation at the mesoscopic level, but instead models anisotropy in a per-frame high-resolution normal and specular intensity maps to achieve a temporally and spatially varying isotropic bidirectional reflectance distribution function (BRDF).

One aspect to the dynamic albedo model is the observation that time-varying skin albedo samples lie near a compact, one-dimensional linear subspace of the standard CIE L*a*b* 1976 color space (denoted "Lab," for simplicity). The techniques demonstrate this relation empirically by measuring time-varying albedo of different skin tones undergoing changes in facial expression and blood flow. As a result, the one dimensional albedo subspace can be restricted to explain changes in appearance that are predominately due to varying skin pigmentation (e.g., concentration of hemoglobin), allowing to separate shading changes from albedo variation. This fact removes ambiguities in albedo estimation but also provides sufficient constraints to recover dynamic surface geometry (normal field) and specular reflectance without the need for time-multiplexed illumination.

In addition to introducing a dynamic appearance model, this disclosure presents a method to fit a model to performance capture data of real subjects. Most notably, the disclosed approach requires only a multi-view camera setup with static illumination. No temporal multiplexing of lighting patterns are required, making the method highly suitable for integration with traditional facial performance capture setups. The skin reflectance maps presented in this disclosure can be acquired from just four color cameras. This advantage alleviates the requirement for separate scanning sessions of previous techniques to recover both facial motion and appearance. Furthermore, since the techniques go beyond static appearance capture, the dynamic performances contain unprecedented per-frame skin reflectance parameters modeling effects such as blood flow.

The disclosed techniques demonstrate the dynamic appearance modeling and fitting strategy by reconstructing a number of performances given by several different subjects with varying skin tones. The recovered time-varying geometry and appearance can be directly suitable for relighting in applications such as visual effects, virtual reality (VR) and augmented reality (AR) simulations, or telepresence.

FIG. 1 illustrates an inverse rendering based approach to capture dynamic appearance properties of human skin, including per frame albedo, high-resolution normal and specular intensity maps, at high fidelity from a passive multi-camera setup. The disclosed techniques capture an input image 102. In some embodiments, the input image 102 can be captured by one or more digital cameras. Additional details of the equipment and capture configuration will be described in conjunction with FIG. 3A.

The system can generate a three-dimensional (3D) rendering 104 of the input image 102 using an albedo map 106 and a shading map 108 of the image data. The techniques allow for modifying the expression of the face for the input image 102. For example, the techniques can produce a second albedo map 110 and a second shading map 112 for a second expression. Further, the technique can generate another relighting rendering 114 that can be created under lighting conditions that differ from the lighting conditions for the input image 102.

The techniques disclosed herein estimate detailed facial appearance information including time varying changes in diffuse albedo and changes in specular reflectance and mesostructure due to skin deformation using a passive facial capture setup without requiring to borrow any information from a database. Unlike previous work, the following techniques target truly dynamic appearance modeling at the temporal resolution of every acquired frame of a facial performance.

Dynamic Appearance Model

Skin appearance does not remain constant over time, but changes at several time-scales. The techniques disclosed herein model the time-varying effects of skin appearance such that it can be estimated from the captured data. The techniques start by reviewing the skin reflectance model and subsequently introduce a dynamic appearance model.

Skin Reflectance Model

The disclosed techniques can model skin as a two-layer material composed of a rough dielectric layer, the stratum corneum, which accounts for reflection at the surface of the skin, and a diffuse layer that accounts for body reflection. The techniques can model the stratum corneum with the microfacet bidirectional reflectance distribution function (BRDF model) as follows:

$$f_s(\omega_0, \omega_i) = \varrho \frac{D(\omega_0, \omega_i, n, \alpha) G(\omega_0, \omega_i) F(\eta, n, \omega_i)}{4|<n, \omega_i><n, \omega_0>|}, \quad (1)$$

where D is the distribution term, which can be modelled using a Blinn-Phong lobe with exponent α, G can be the standard geometric masking/shadowing term, and F can be the Fresnel term, which can be modelled using Schlick's approximation. The specular intensity ρ controls how strongly the incoming light is reflected at this location, and is influenced by properties such as oiliness or specular ambient occlusion. To make dynamic capture well-constrained, the technique assumes a known index of refraction η for skin and specular lobe α.

The technique can model the body reflection as a simple diffuse Lambertian lobe $$f_d(\omega_0, \omega_i) = \psi \frac{\rho}{\pi}, \quad (2)$$

where ρ is the red-green-blue (RGB) albedo color. An additional scalar parameter ψ is introduced to capture residual diffuse ambient occlusion in locations where the initial base mesh does not capture fine geometric detail, for example in wrinkle folds. The techniques employ this simple model for the body reflection instead of a more sophisticated subsurface scattering model for ease of model-fitting from the acquired data. Following the dichromatic reflection model, the full appearance model can be expressed as the sum of Eq. 1 and Eq. 2, $$f_r(\omega_0, \omega_i) = f_d(\omega_0, \omega_i) + f_s(\omega_0, \omega_i) \quad (3)$$

Dynamic Albedo

Skin albedo is the measure of incident light or radiation that is reflected by a surface of the skin. Skin albedo can mainly be the result of underlying concentrations of melanin and hemoglobin in the skin. The techniques disclosed herein assume that albedo changes are only caused by varying hemoglobin concentration due to blood flow, which is a reasonable assumption at the time-scales the techniques are concerned with. When modeling longer time-scales, one might also have to take into account changes in melanin concentrations, for example, due to tanning. The blood concentration in skin can change either due to physiological effects, such as blushing, or physical effects such as muscular activity that actively presses hemoglobin out of one part of the skin and into another. The techniques model this variation in albedo due to blood flow using a subspace which can be analyzed as follows.

Albedo Subspace

Figure 2A:
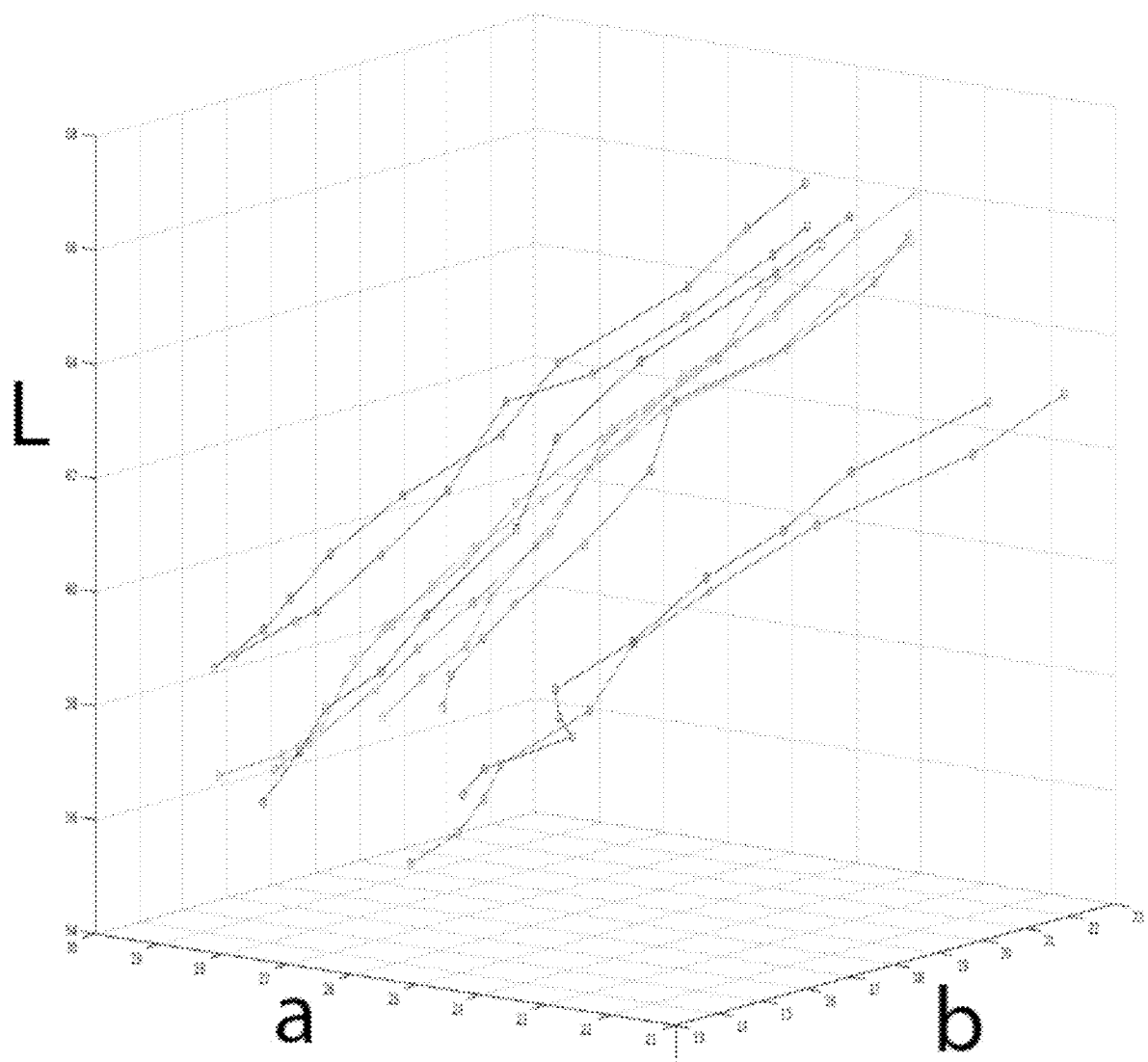
FIG. 2A illustrates an exemplary graph of albedo change over time.

FIG. 2A depicts a graph of albedo change over time. The CIELAB color space (also known as CIE L*a*b* or sometimes abbreviated as simply "Lab" color space) is a color space defined by the International Commission on Illumination (CIE) in 1976. It expresses color as three numerical values, "L" for the lightness and "a" and "b" for the green-red and blue-yellow color components. CIELAB was designed to be perceptually uniform with respect to human color vision, meaning that the same amount of numerical change in these values corresponds to about the same amount of visually perceived change.

FIG. 2A depicts that skin albedo with a given melanin concentration projects onto a single line in the L-b plane of the Lab color space. The line can be characterized by its angle with the b axis, called the typology angle of skin. FIG. 2A depicts the time-varying component of skin albedo and shows that it resides within a one dimensional manifold v in Lab space as blood flow is observed during facial performance. The albedo values for this subspace analysis can be obtained in a separate capture process using cross-polarization to isolate the pure diffuse reflectance.

Thus, for a given skin patch (texel), the subspace models for the disclosed techniques depict the albedo $\rho^f$ at any point in time (frame) f as a combination of a base albedo $\rho^0$ in Lab space plus a scalar $h^f$ describing blood-flow-induced change in hemoglobin concentration, $$\rho^f = \mathcal{T}_{Lab}(\rho^0 + h^f v), \quad (4)$$

where $\mathcal{T}_{Lab}$ denotes the transformation from Lab to RGB space. The albedo subspace can correspond to a line segment centered at the base albedo, since the disclosed techniques can observe a limited amount of blood flow during performance capture. This constraint can be enforced during model fitting by penalizing the magnitude of $h^f$ (deviation from the base albedo). In addition, the techniques can further constrain the change in hemoglobin concentration $h^f$ to be spatially smooth, while allowing the base albedo to model the full skin pigmentation and spatial detail.

Figure 2B:
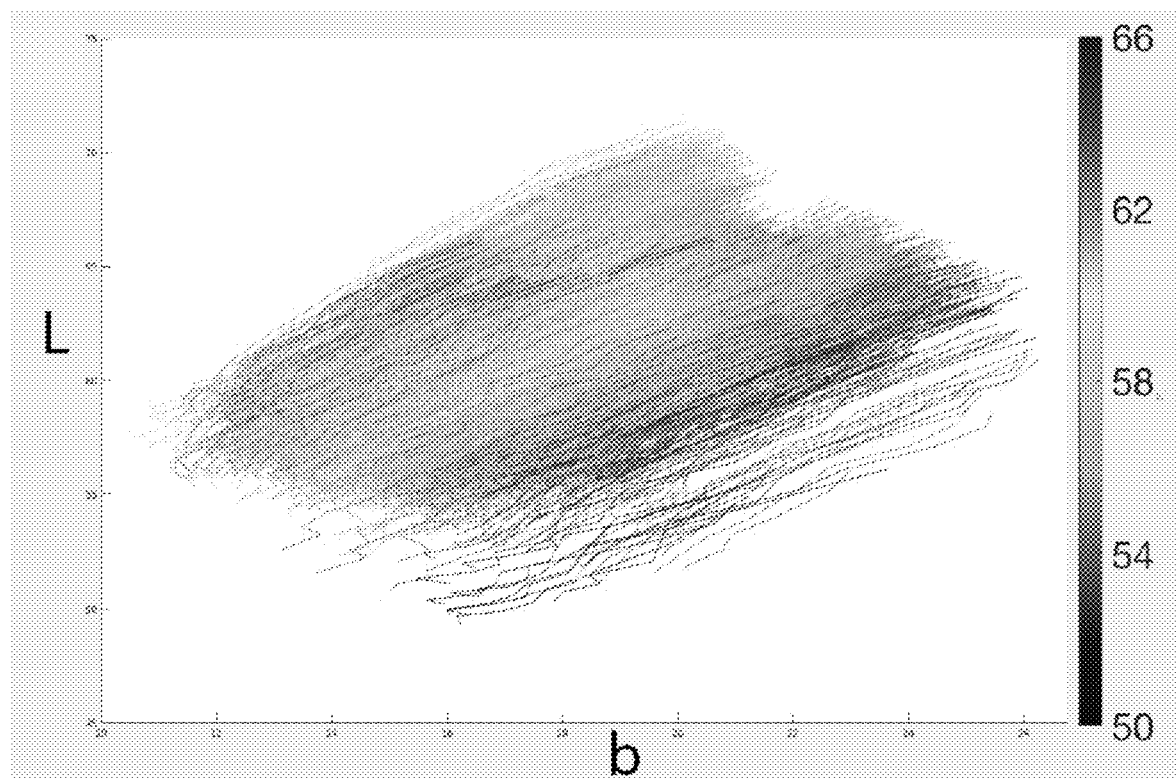
FIG. 2B illustrates an exemplary graph of multiple lines for albedo change over time for a single person.

FIG. 2B shows all the lines for a single person. FIG. 2B depicts how the lines follow the same general direction but with a slight variation of angle related to the base albedo. FIG. 2B depicts that variation over a person's face can be limited to ±6 degrees.

Figure 2C:
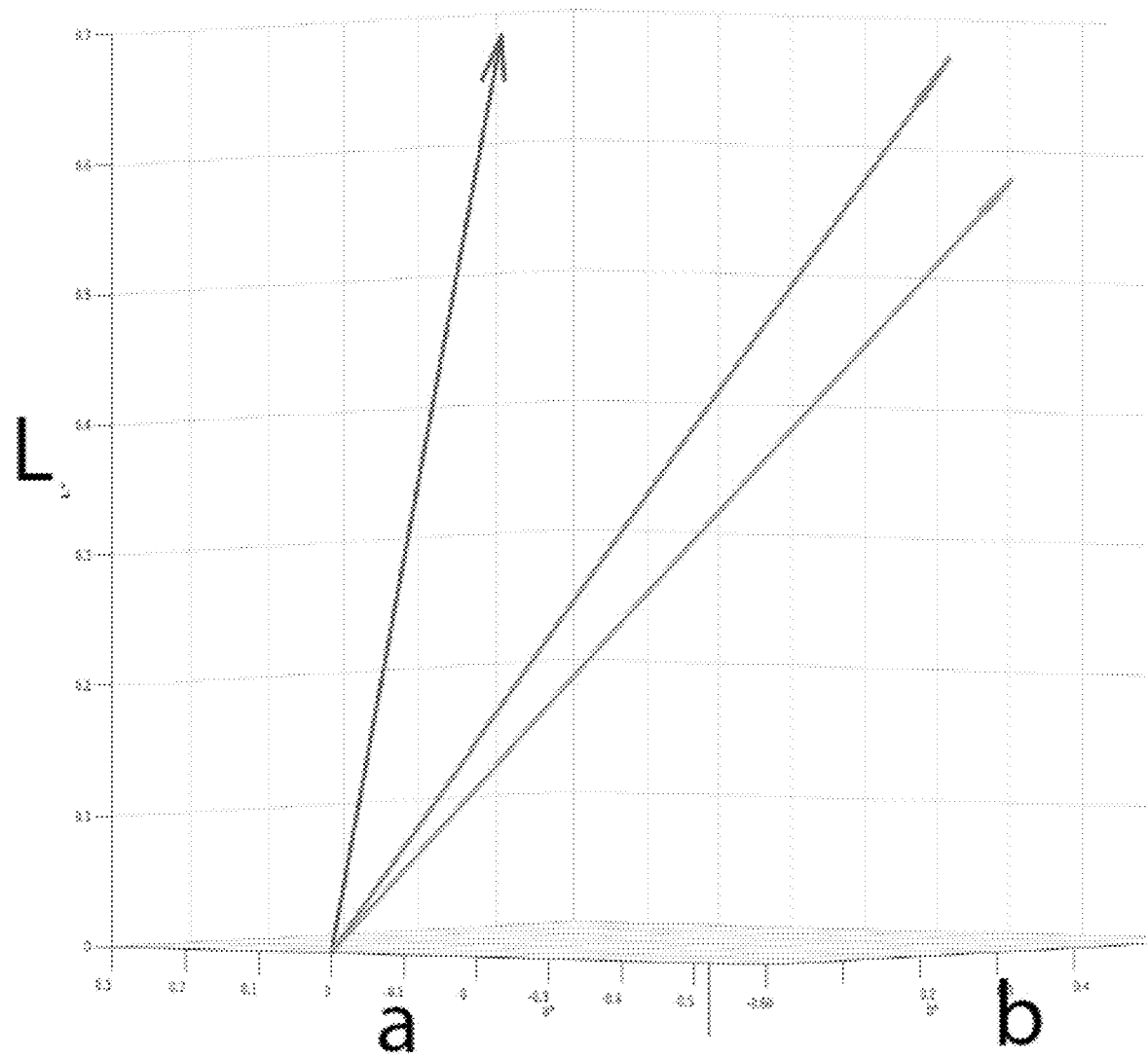
FIG. 2C illustrates an exemplary graph of albedo change over time for different skin types.

FIG. 2C shows that the albedo line direction v can vary considerably among people as a function of their skin typology. This finding further constrains the disclosed model and facilitates capturing v: once its effect is observed on a small face area, its estimate can be applied over the whole face.

A result of the disclosed albedo subspace model can be that base albedo $\rho^0$ and its hemoglobin direction v can be pre-acquired (and fixed) using a simple protocol. Then, dynamic albedo capture only requires the estimation of a single degree of freedom $h^f$ per texel and per frame. By constraining the dynamic albedo in this way, the disclosed model makes it tractable to estimate dynamic, non-Lambertian BRDF parameters and resolve high-resolution per-frame surface normal without requiring active, cross-polarized illumination, as can be demonstrated in the following sections.

Dynamic Appearance Estimation

The disclosed techniques can solve for the per-frame parameter vector $\Theta^f = \{\rho^0, v, h^f, \psi^f, \varrho^f, n^f\}$ in the disclosed dynamic appearance model introduced above in sec:model. The techniques assume that camera and lighting calibration, and three-dimensional (3D) face mesh tracking have been performed a priori, as detailed below. The techniques also assume that the hemoglobin direction v has been captured from a small face area, using a separate capture protocol detailed below.

At the core, the inverse rendering pipeline estimates optimal parameters by minimizing the residual between a synthesized pixel and its captured color $c^{f,\omega_0}$ in the camera views $\omega_o \in \mathcal{V}$ where it is visible. The techniques model incident illumination as a set of directional light rays $\omega_i$ that are sampled over the spherical domain ($\Omega$) and present constant illumination color $c^{\omega_i}$. For each texel, the techniques denote the set of unoccluded lights at that texel location as $\mathcal{L}$. Using Eqs. 1-4, the rendering loss for the disclosed techniques can be formulated for each frame and texel as:

$$E(\Theta^f) = \Sigma_{\omega_o \in \mathcal{V}} w^{f\omega_o} \| c^{f\omega_o} - \Sigma_{\omega_i \in \mathcal{L}} f_r(\omega_o, \omega_i, \Theta^f) \langle n^f, \omega_i \rangle c^{\omega_i} \Delta\omega \|_2^2, \quad (5)$$

with solid angle $\Delta\omega$. Here, $w^{f\omega_o}$ can be a precomputed per camera weight that encodes how trustworthy the observation $c^{f\omega_o}$ is due to factors such as focus, motion blur and foreshortening to downweight less reliable samples.

In various embodiments, the techniques operate entirely in the texture space of the tracked 3D face mesh, which facilitates pooling data across views and, when necessary, also across time. All input data can be converted into texture domain and visibility information is precomputed and stored in the input texture maps. For each frame, the techniques can also precompute self-shadowing maps given the light rays and 3D face geometry. The final output of the method can be a per-frame, multichannel parameter map with per-texel vectors $\Theta^f$.

To estimate this parameter map, the techniques implement the appearance model as an auto-differentiable renderer using Ceres Solver. To navigate around local minima and improve robustness, the techniques optimize using block coordinate descent and compute the solution in three main steps. In each step the techniques optimize a different subset of the parameters $\Theta^f$, with different constraints, as detailed next.

Base Albedo $\rho^0$ and Specular Intensity $\varrho^0$

The techniques can first conduct a calibration process that may be required only once per actor. Given the pre-acquired hemoglobin direction $v$, the techniques capture the origin of the albedo subspace for every texel. The base $\rho^0$ captures the full skin pigmentation and its spatial detail. The techniques achieve this by requiring the actor to hold a neutral expression while also slowly rotating their head up-down, left-right, to form a cross pattern. This simple protocol provides roughly 30 frames at different illumination conditions and properly constrains parameter estimation without requiring active illumination. Here, the techniques can minimize the above rendering loss over all these frames, jointly.

For these neutral frames, the techniques fix base hemoglobin concentration $h^f = 0$ and $\psi^f = 1$, $\forall f$. The techniques can solve for constant $\rho^f = \rho^0$ (in plain RGB, before converting to Lab) and $\varrho^f = \varrho^0$. Given the (known) rigid head motion, the techniques can represent $n^f$ on the tangent space of the 3D face mesh and compute a new texel normal $n^0$ that is also shared over all frames. Considering all texels, this tangent space normal field can be parameterized using a height surface $z$, which can present integrability as a hard constraint and only a single degree of freedom per texel (instead of 2), making normal estimation better constrained. The tangent space normal $n^0$ can be given by the partial derivatives (forward differences) of $z$ at the texel location, $$n^0 = \begin{bmatrix} -z_t \\ -z_b \\ 1 \end{bmatrix} (1 + z_t^2 + z_b^2)^{-\frac{1}{2}}, \text{ with } n^f = R^f n^0, \quad (2)$$

where t ad b are the tangent and bitangent directions and the 3D rotation $R^f = [t^f b^f (t^f \times b^f)]$ can be precomputed from the 3D face mesh at frame f and defines the local tangent space of the texel. Initializing $z=0$ everywhere (constant) corresponds to initializing f to the normal of the base mesh at frame f. The new normal does not depend on the absolute value of z, only on its derivatives. The techniques therefore constrain z to remain near 0 by penalizing its magnitude squared.

The calibration process estimates 5 degrees of freedom per texel ($\rho^0$, $\varrho^f$, z) using about 30 samples acquired under varying illumination (relative motion between head and light rig). The disclosed tangent space normal parameterization using the height surface z couples the solutions of all texels; however, the solutions can easily parallelized via an iterative, alternated optimization strategy on a Red-Black texel grid.

Step 1: Per-Frame Normals $n^f$

Once the calibration process above is completed, the only remaining degree of freedom in the albedo subspace is $h^f$. The disclosed techniques can independently process new frames with arbitrary facial expressions. For a given, single frame f (4 camera views), Step 1 estimates three degrees of freedom in $\{h^f, \rho^f, n^f\}$ as to minimize (1). In this stage, the technique estimates a high-detail normal field, parameterized by $z^f$ as above. To avoid ambiguities in representing shading in the input face images, the technique initially maintain $\psi^f=1$ fixed; $h^f$ and $\varrho^f$ can be allowed to vary but both are constrained to be spatially smooth (using a standard TV-L2 regularizer on the disclosed texel grid).

The effect of these constraints can be to initially push as much geometric detail as possible into the normal map represented by $z^f$, which is responsible for explaining most of the observed high-frequency shading. To further improve detail resolution, the techniques can apply different, per color channel weights ($w^R=0.1$, $w^G=0.3$, $w^B=1.0$) to the loss (1) to account for wavelength-dependent blurring due to subsurface scattering. The techniques can also find it beneficial to constrain normal estimation with a weak Laplacian regularizer on a 3×3 neighborhood of $z^f$, as to handle small regions of texels with ambiguous solutions.

As the albedo subspace actually defines a sector along a one dimensional subspace (i.e., observable concentrations of hemoglobin), the techniques regularize the estimates $h^f$ to remain near 0, the base albedo. A weak regularizer can also placed on $\varrho^f$ of to bias its estimate towards the neutral $\rho^0$ when the data evidence is weak.

Step 2: Per-Frame Albedo $\rho^f$, Diffuse Ambient Occlusion $\psi^f$, and Specular Intensity $\rho^f$ The techniques can fix the normals estimated above and focus on recovering the other BRDF parameters. To estimate optimal appearance parameters, the techniques can weigh color channels uniformly. In addition, the techniques can also fit $\psi^f$ and remove the spatial smoothness constraint from $\varrho^f$. The intended effect is to explain any residual shading (ambient occlusion on both diffuse and specular layers) not captured by the high-detail normals and base 3D face mesh. However, the techniques still require that hemoglobin concentration values $h^f$ be spatially smooth and not too far from the base albedo (simple L2-norm regularizer). Finally, the techniques can also maintain the regularizer on specular intensity, $\varrho^f$, biasing it towards the better constrained base $\varrho^0$ estimated in the calibration step.

Data Acquisition and Preprocessing

In this section the techniques for acquiring the input data for the presented method are disclosed, as well as data preprocessing steps to compute derived data using various algorithms.

Hardware Setup

Figure 3A:
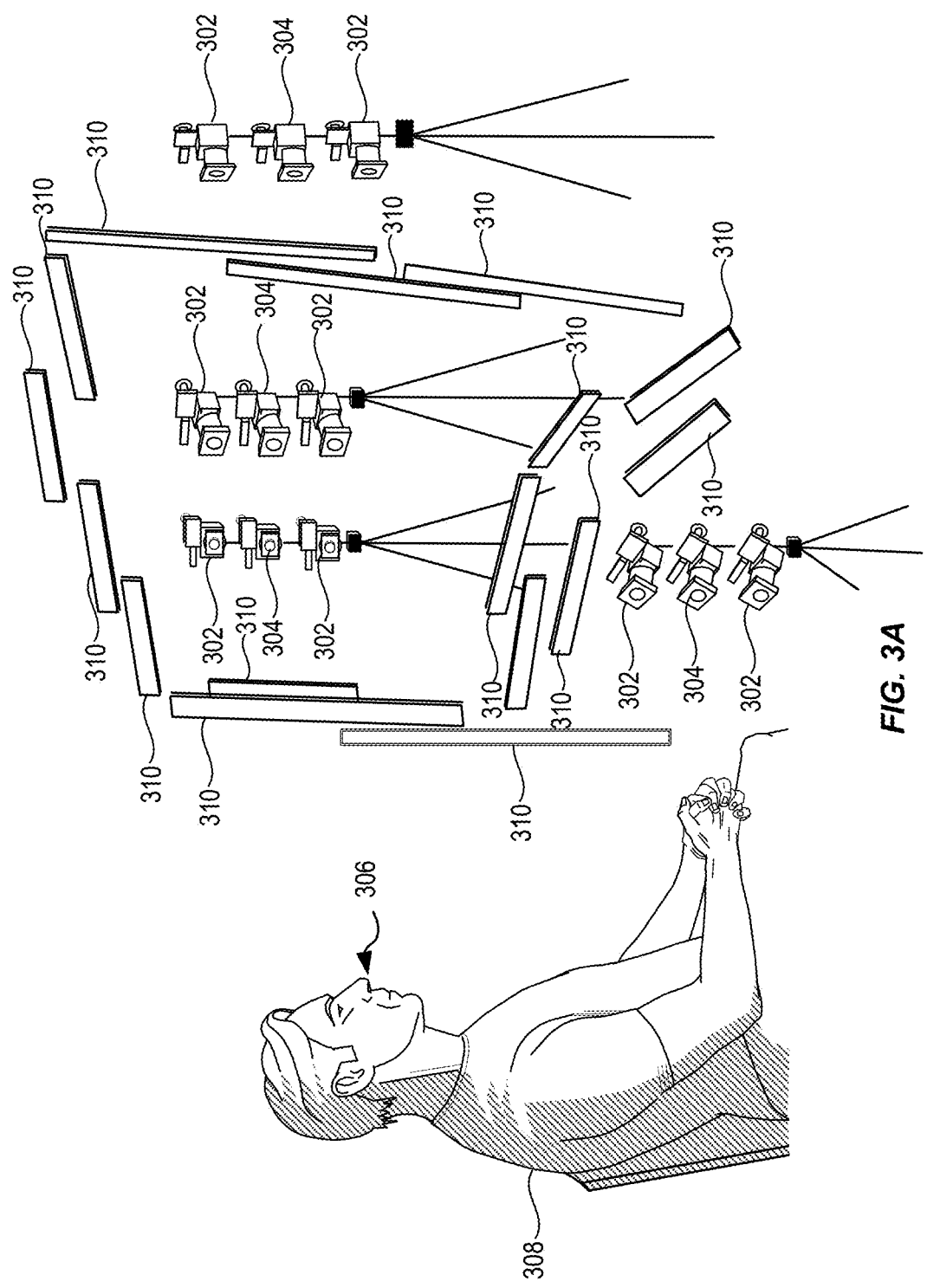
FIG. 3A illustrates an exemplary camera and lighting set-up for dynamic appearance capture of skin.

FIG. 3A illustrates an exemplary camera and lighting set-up for dynamic appearance capture of skin. In various embodiments, the capture setup can consist of a multi-view stereo-rig composed of a plurality of cameras 302 (e.g., 12MP Ximea CB120MG cameras) arranged in stereo-pairs in order to cover the face 306 of an actor 308, which are used to reconstruct the base 3D model. In one non-limiting embodiment, the multi-view stereo-rig can include eight monochrome cameras 302 arranged in four stereo-pairs. The techniques can interleave multiple additional color cameras 304 (e.g., 20MP Ximea CB200CG), one between each stereo-pair of monochrome cameras 302, to record red-green-blue (RGB) color data for facial appearance estimation at a defined rate. However, the techniques are not limited to RGB color data. In various embodiments, the defined rate can be 30 frames per second. During performance capture, the techniques can illuminate the actor 308 with constant white illumination provided by multiple light sources 310 placed in front of the actor 308. In an embodiment, the multiple light sources 310 include 16 light emitting diode (LED) strips. The strips can be clustered to produce two horizontal and two vertical linear light sources, where the horizontal ones illuminate the face slightly from below and above and the vertical ones from each half-profile.

Figure 3B:
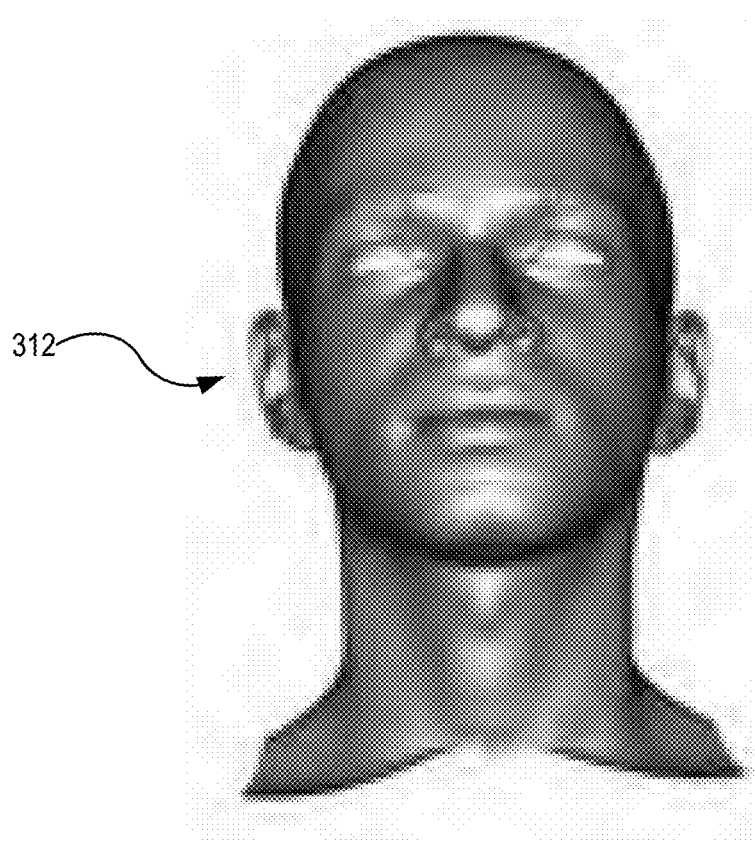
FIG. 3B illustrates an exemplary 3D geometry model of the face of a subject.

FIG. 3B illustrates an exemplary animation of the face of a subject. The rendering 312 captures appearance maps of the face of a subject using the multiple digital cameras and lighting as describe above.

Figure 3C:
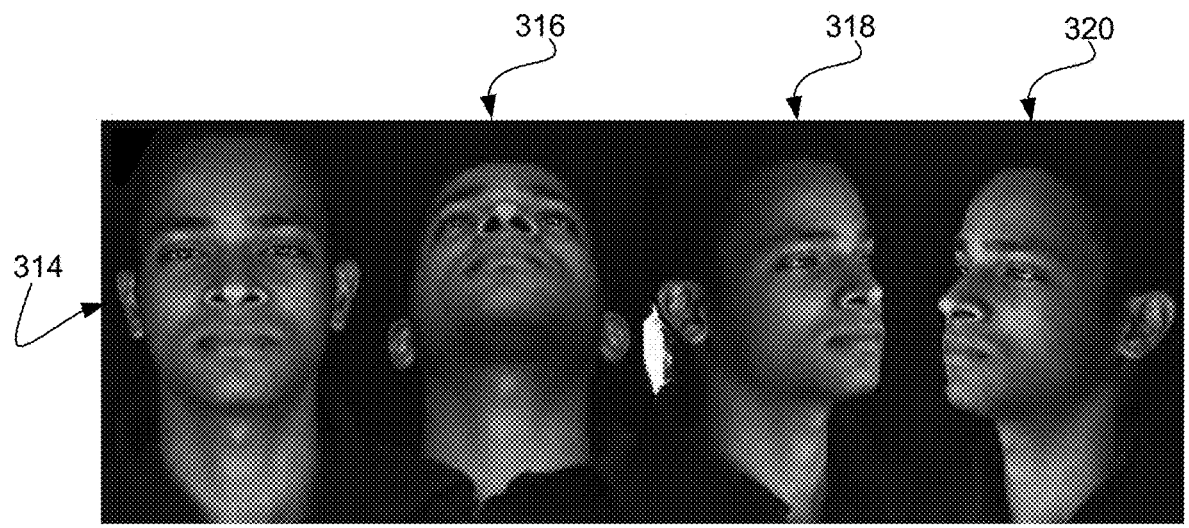
FIG. 3C shows a series of poses for capture of dynamic appearance capture of skin.

FIG. 3C shows an a series of poses for capture of dynamic appearance capture of skin. Front image 314 shows a front perspective of the face of an actor. Facing up image 316 shows a perspective of the actor's face tilted upwards. Right perspective image 318 shows a perspective view of the right side of an actor's face. Left perspective image 320 shows a perspective view of the left side of an actor's face.

Figure 3D:
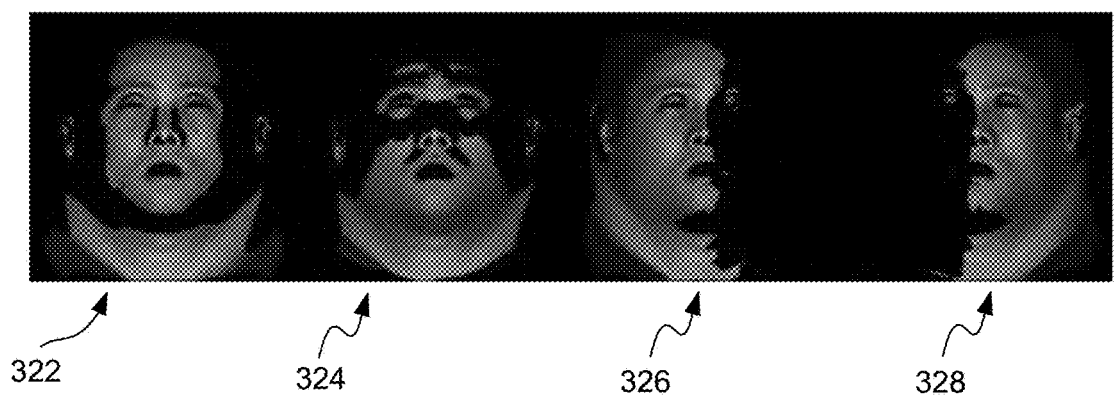
FIG. 3D shows an exemplary inverse rendering of a subject.

FIG. 3D shows an exemplary inverse rendering of a subject. A first inverse rendering 322 depicts an inverse rendering image of the front image 314. A second inverse rendering 324 shows an inverse rendering image of the facing up image 316. A third inverse rendering 326 shows an inverse rendering image of the right perspective image 318. A forth inverse rendering 328 shows an inverse rendering image of the left perspective image 320.

Calibration

The techniques can utilize both geometrically and photometrically calibrated cameras. After each acquisition session, the techniques can capture a planar calibration target with fiducial markers for geometric calibration, plus an X-Rite COLORCHECKER® chart for photometric calibration of the acquired footage with respect to a linear sRGB color space. The COLORCHECKER Classic target is an array of 24 scientifically prepared natural, chromatic, primary and grayscale colored squares in a wide range of colors. Many of the squares represent natural objects, such as human skin, foliage and blue sky. Since the squares exemplify the color of their counterparts and reflect light uniformly in all parts of the visible spectrum, the squares will match the colors of representative samples of natural objects under any illumination, and with any color reproduction process. Each solid patch is formulated individually to produce a pure, flat, rich color.

Environment Map

The techniques seek to accurately model the incident illumination for inverse rendering. For this purpose, the techniques utilize a high dynamic range (HDR) light probe of the surrounding environment to capture a mirror sphere at several exposures using the frontal color camera. From the calibrated cameras, the techniques estimate the position of the mirror sphere in the scene and compute a latitude-longitude environment map. The techniques compress the environment map to numerous light directions by integrating for each light direction the radiance within the corresponding Voronoi area in the environment map. For human skin, this reduction to a few hundred lights can be reasonable, yielding a lighting resolution comparable to that typically employed with Light Stages.

Base Geometry Reconstruction

For the presented dynamic appearance capture the techniques utilize a base mesh, fully tracked over time. The techniques can apply a state-of-the-art passive multi-view performance capture system to reconstruct geometry using the multiple cameras and track a consistent topology to all frames. The resulting shapes can be stabilized with respect to the neutral face. From the multiple color cameras, the techniques can compute high-resolution texture maps. Since the disclosed inverse rendering framework can operate in texture space, the techniques can also encode the vertex positions and base normals as texture maps for every frame. The techniques further compute for each color camera per frame visibility textures as well as weight textures. These weight textures can encode a per texel weight that measures how sharp the texel is, integrating information from camera focus and motion blur.

Albedo Blood Flow Subspace

The dynamic albedo can be described by varying blood flow over time. This blood flow can be parameterized by an albedo subspace, characterized by a single line in Lab color space. Since the slope of the line is person-specific and depends on skin type, the techniques can utilize a simple method to pre-compute the line for the given capture subject. In a non-limiting embodiment using a digital single-lens reflex (SLR) camera with a mounted ring flash, the technique can photograph a small patch of skin in burst mode, immediately after the actor presses firmly on the skin with their fingers. This sequence of photos provides a time-varying measure of hemoglobin concentrations, to which the technique can fit a line in Lab space. The techniques can use linear cross-polarization on the flash and camera lens to filter out specular highlights, and align the images using optical flow to account for small motion. The images can be color calibrated using an X-Rite COLORCHECKER, and the techniques place white markers in the scene to compute and account for any variability in the ring flash from photo to photo.

Figure 4:
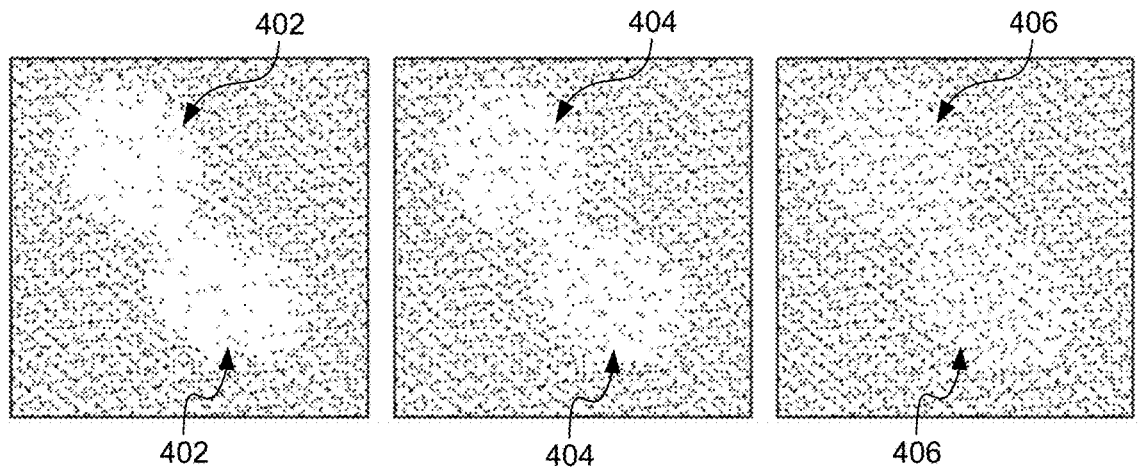
FIG. 4 shows a series of photographic images capturing the color subspace for dynamic albedo after pressing firmly on the skin.

FIG. 4 shows a series of photographic images capturing the color subspace for dynamic albedo after pressing firmly on the skin for one actor. The first image shows a first dynamic albedo 402 immediately after releasing the pressure on the skin. The second image shows a second dynamic albedo 404 a few seconds after releasing the pressure on the skin. The third image shows a third dynamic albedo 406 in which the albedo appears to return to steady state after releasing the pressure on the skin. The amount of albedo change and the rate of change can be calculated using a series of digital images of the patch of skin over time.

Figure 5:
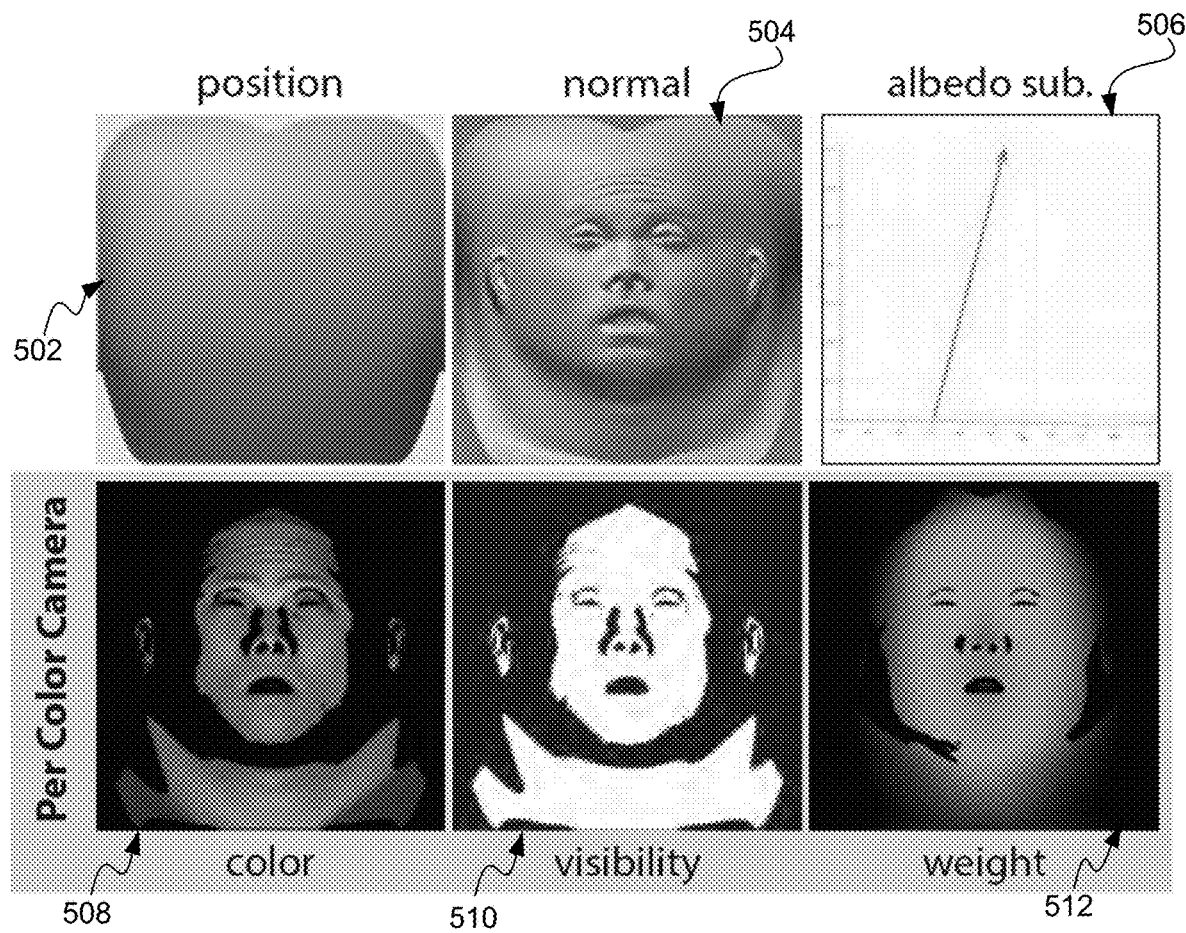
FIG. 5 shows a series of maps and graphs for the inverse rendering process for dynamic appearance of skin.
Figure 6:
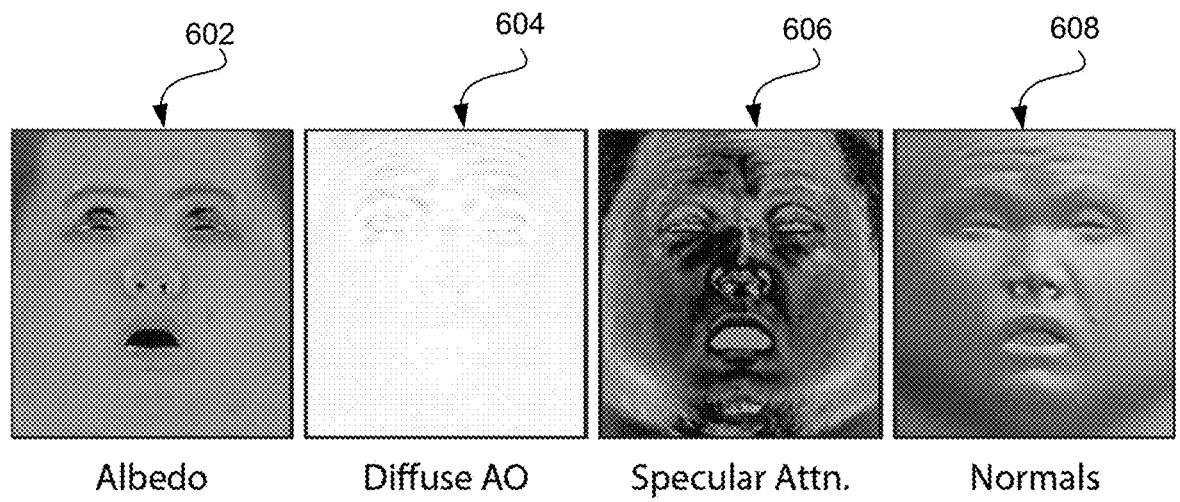
FIG. 6 shows exemplary images of a plurality of maps for dynamic appearance of skin.

FIG. 5 shows a series of maps and graphs for the inverse rendering process for dynamic appearance of skin. The techniques prepare input data for the inverse renderer in texture domain, computing per frame position map 502 and normal map 504. The normal map 503 captures the images of the face of an actor from a perpendicular view. The techniques can pre-compute the dynamic albedo blood flow subspace as a line in Lab Space 506. Furthermore, the techniques generate a color texture 508, visibility 510, and weight 512 maps for every color camera Results and Evaluation
Dynamic Appearance Maps FIG. 6 shows exemplary images of a plurality of maps for dynamic appearance of skin. The output of the proposed technique can be a set of four parameter maps per frame, namely albedo 602, diffuse ambient occlusion (AO) 604, specular attenuation 608, and high-resolution normals 608. These maps are time-varying and can be used with existing rendering packages to render a face under different illumination conditions.

Albedo Map

Figure 7:
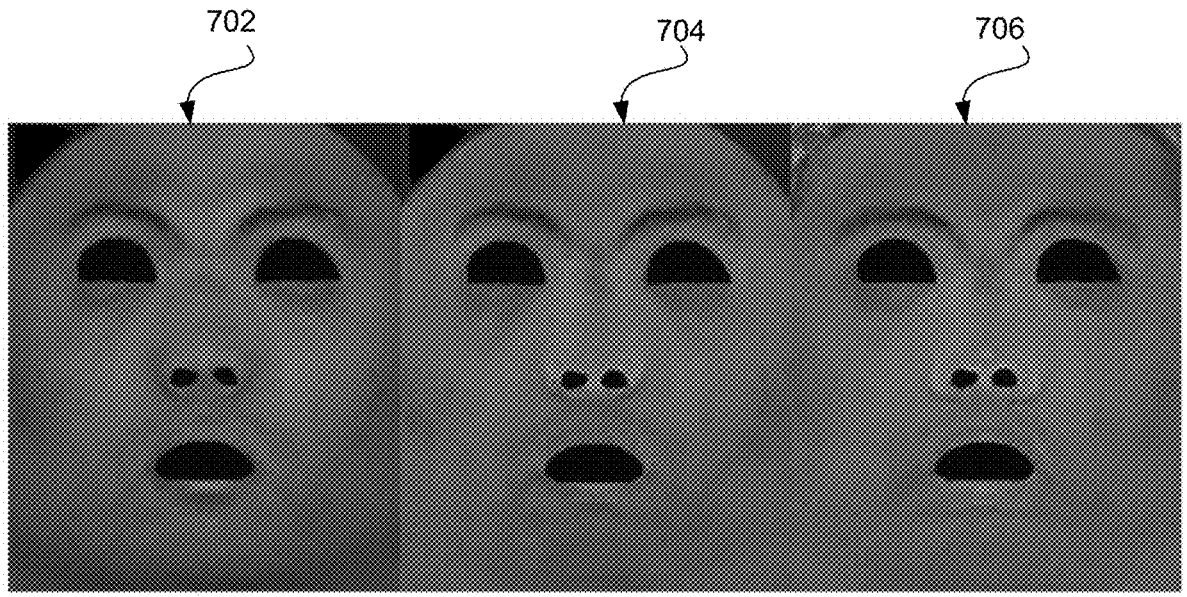
FIG. 7 shows exemplary images for quality of albedo estimation.

FIG. 7 shows exemplary images for albedo validation. The albedo map contains the shading free color of the face. When acquiring an albedo in production, typically the face of a subject can be illuminated as uniformly as possible and captured using cross-polarization. While the cross-polarized filters can succeed at removing direct specular reflection from the skin, diffuse shading will remain baked into the resulting map as seen in diffuse shading image 702. Applying the proposed inverse rendering pipeline on cross-polarized data allows to remove this shading and produces a shading free albedo as seen in shading free image 704. Finally, the presented techniques succeed at extracting a very similar albedo from regular un-polarized data, showing that it can effectively separate diffuse and specular reflection computationally at a similar quality as physical polarization. Unpolarized image 706 shows an albedo of similar quality with negligible shading from the regular unpolarized footage (captured at a different time from setup as seen in FIG. 3A).

Figures 8A, 8B:
FIG. 8A shows exemplary images of a dynamic albedo map due to exercise.
FIG. 8B shows exemplary images of a dynamic albedo map due to facial muscles.

FIGS. 8A and 8B show exemplary images of a dynamic albedo map. The techniques compare the input images to the disclosed dynamic albedo maps. Albedo can change over time due to blood flow as seen in FIGS. 8A and 8B, either caused by physiological effects such as exercise FIG. 8A or due to physical pressure exerted onto the skin when activating facial muscles FIG. 8B. FIG. 8A shows physiological effects such as exercise or overheating that can cause blood flow that can be seen by splitting two different frames left-right, in particular in the forehead. Exercise input image 802 displays the effects of exercise on the albedo of the skin on forehead of a subject. Exercise albedo image 804 depicts the albedo map highlighting the color changes on the forehead of a subject.

FIG. 8B shows that facial expressions can also cause blood flow (shown as forehead crop over time). This blood flow can be apparent for several frames after the expression returns to normal due to hysteresis over time. The disclosed techniques can recover both of these effects in the captured performance. Blood flow is not instantaneous, which causes hysteresis effects over time. This effect can be shown in FIG. 8B, where it takes several frames until blood has fully returned after releasing an expression. By constraining albedo to change along a one-dimensional subspace, which the techniques can precompute per actor as described in FIG. 8B, the proposed method recovers high-quality per-frame albedo maps. FIG. 8B also depicts a first albedo map 806, a second albedo map, and a third albedo map 808 which can show the albedo change due to blood flow from the expression.

Diffuse Ambient Occlusion Map

The diffuse occlusion map introduce can capture residual diffuse shading that stems from the base mesh not faithfully capturing the geometry everywhere, in particular in wrinkle folds.

Specular Intensity Map

Figure 9:
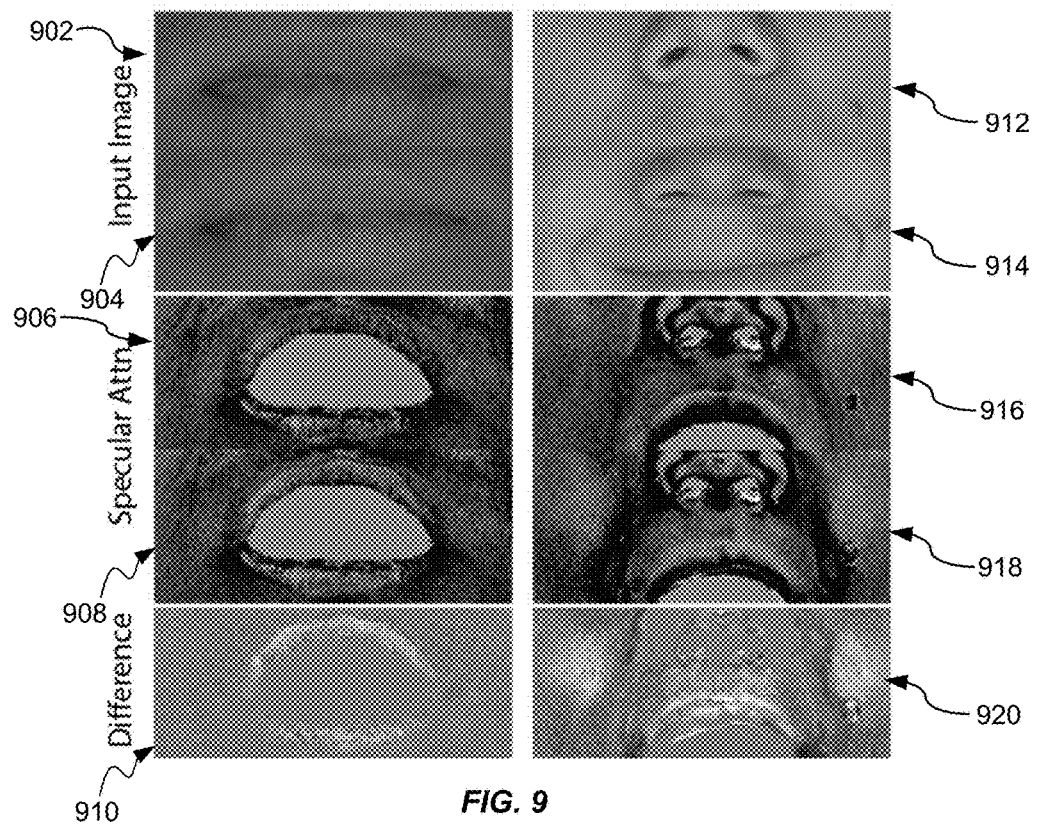
FIG. 9 shows exemplary images of a dynamic specular intensity map.

The specular intensity map can be generated by modulating the light reflected off the skin surface. FIG. 9 shows exemplary images of a dynamic specular intensity map. The amount of light reflected off the skin can change over time and can depend on a variety of factors, such as oiliness or wetness of the skin or the skin microstructure, which can change due to skin stretching. The left column of FIG. 9 shows an example where the actor wets his lips between the two subsequent digital photographs. Wetting the lips can increase specular reflectance. The first input image 902 is a picture of an actor prior to wetting his lips. A second input image 904 is a picture after wetting his lips. The first specular attenuation image 906 displays a baseline specular intensity image prior to wetting the lips. The second specular attenuation image 908 displays a second specular intensity image after the actor wets his lips. Finally, a first differenace image 910 shows a difference between the first specular attenuation image 906 and the second specular attenuation image 908. The first difference image 910 highlights the effect of wetting the lips between the two images.

The right column of FIG. 9 depicts the expression of the actor that causes skin to stretch as the cheeks bulge, which can result in an increase in specular reflection. In addition, the map also can account for specular ambient occlusion caused by mesoscopic skin detail, such as pores. All of those properties can change over time, which motivates per frame specular intensity maps. A third input image 912 shows a portion of a face of the actor, specifically the nose and upper lip. The forth input image 914 shows the same portion of the face of the actor smiling. A third specular attenuation image 916 depicts the face of the actor that corresponds to the third input image 912. The forth specular image 918 shows a specular image that corresponds to the forth input image 914 showing the portion of the face with the actor smiling. A second difference image 920 shows a difference between the third specular image 916 and the forth specular image 918 showing the differences. The second difference image 920 shows hi-lighted regions on the cheeks of the actor and on the upper lip of an actor.

Dynamic Normal Map

Figures 10, 11:
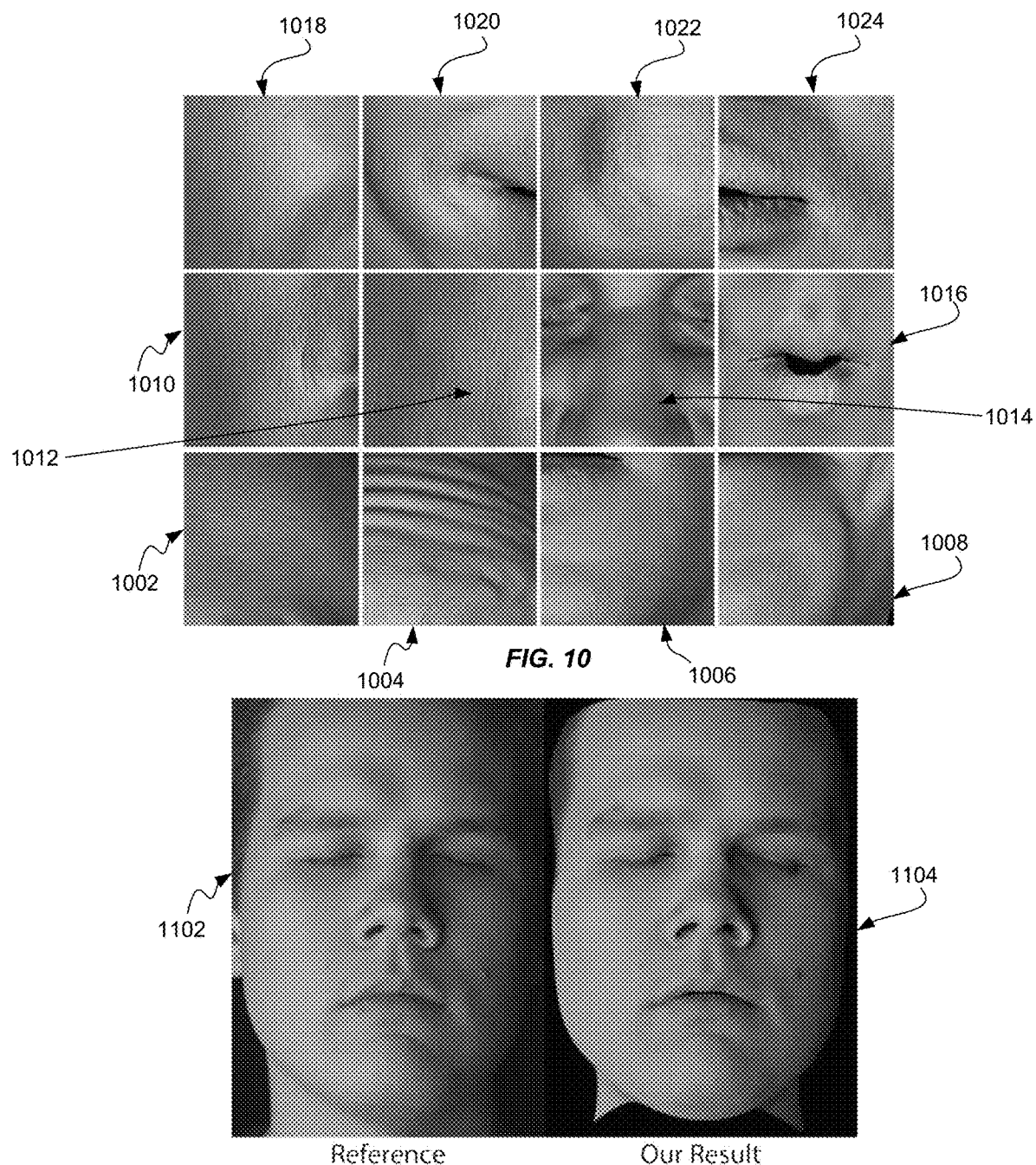
FIG. 10 shows exemplary images of skin detail in the computed normal maps.
FIG. 11 shows exemplary rendering of a face under novel lighting conditions.

FIG. 10 shows various images of skin details. FIG. 10 shows closeups of various areas on the face showing the detail the method can recover, ranging from pores to finescale wrinkles. The Skin surface is not flat but covered by mesoscopic detail that is too finescale to be picked up by the coarse base mesh, such as pores and fine wrinkles. A first skin detail image 1002 shows a forehead prior to eyebrows being raised. A second skin detail image 1004 shows strong anisotropic wrinkles when the eyebrows are raised. A third detail image 1006 shows a portion of a relaxed face. A fourth detail image 1008 shows a patch around the chin showing deformation caused by a muscle pulling a skin tissue towards the upper left side of the image, causing pores and wrinkles to stretch in an elliptical pattern. A fifth detail image 1010 shows a detailed image of wrinkles along a cheek in the vicinity of the base of a nose. A sixth detail image 1012 shows a detail image of a cheek of a face. A seventh detail image 1014 shows a detail image of a bridge of a nose. An eighth detail image 1016 shows an image around pursed lips. A ninth detail image 1018 shows an image of the forehead. A tenth detail image 1020 show a detail of a nostril. A eleventh detail image 1022 shows a detail of a chin. A twelfth detail image 1024 shows a detail image of a portion of lips. As skin stretches or compresses, these details change dramatically and strongly influence the appearance of the face. The disclosed techniques can recover high-quality per-frame normal maps that encode this dynamic geometric detail.

FIG. 11 shows a comparison between a reference image 1102 and a rendered image 1104. FIG. 11 validates the captured appearance by rendering the face under a novel lighting configuration with approximately half the lights turned off. The rendered image 1104 closely matches a reference image recorded under the same conditions.

Figure 12:
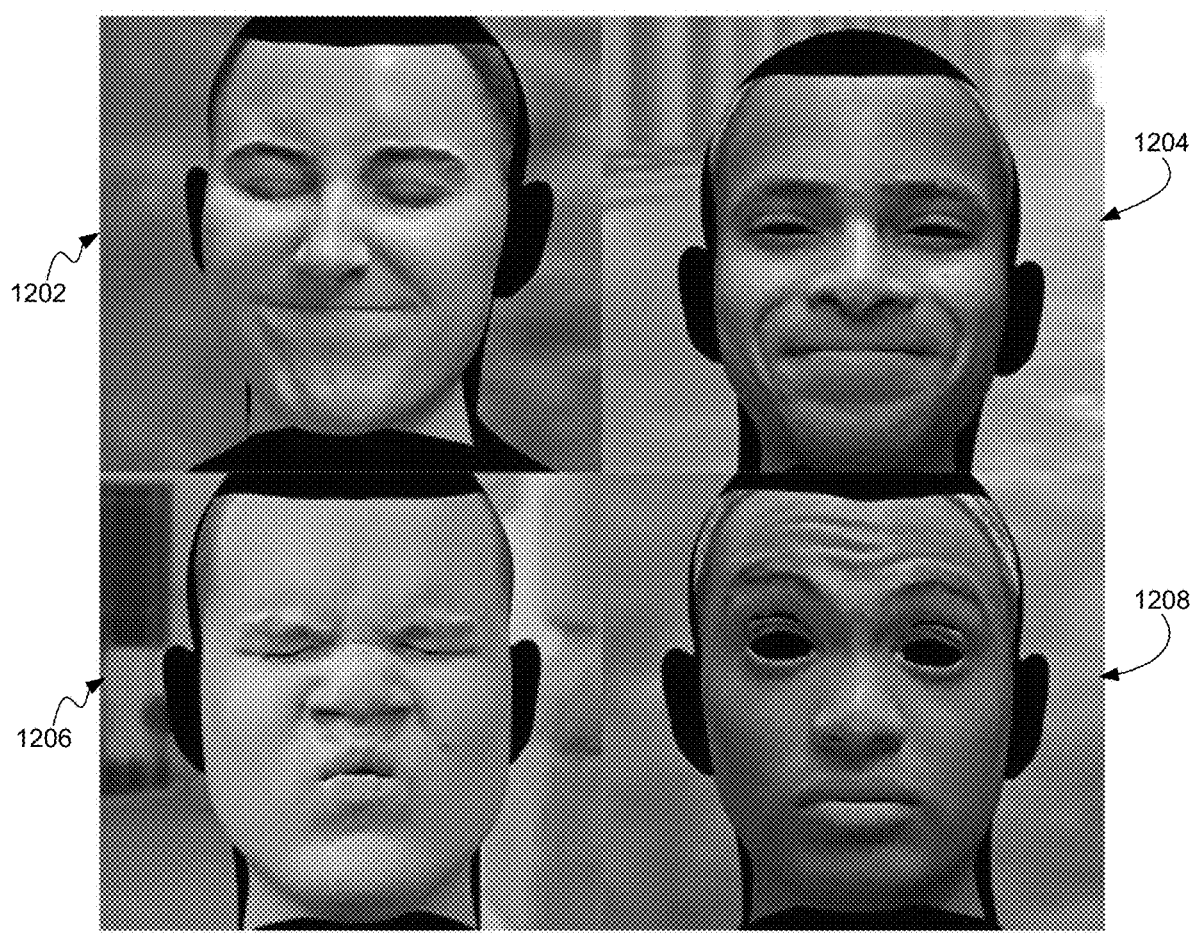
FIG. 12 shows exemplary re-rendering of the captured faces with the disclosed appearance parameters under novel environment lighting conditions.

FIG. 12 demonstrates the ability to re-render the captured faces with the appearance parameters under novel lighting conditions. FIG. 12 highlights the ability to relight the captured faces under novel illumination by re-rendering in a commercial renderer (e.g., Autodesk Maya) using four different environment maps. First lighting condition image 1202 shows a rendering of the face in which the lighting is only from the left side. The second lighting condition image 1204 shows a rendering of the face under a second environment map. The third lighting condition image 1206 shows a rendering of the face under a third environment map. The fourth lighting condition image 1208 shows a rendering of the face under a fourth environment map.

Figure 13:
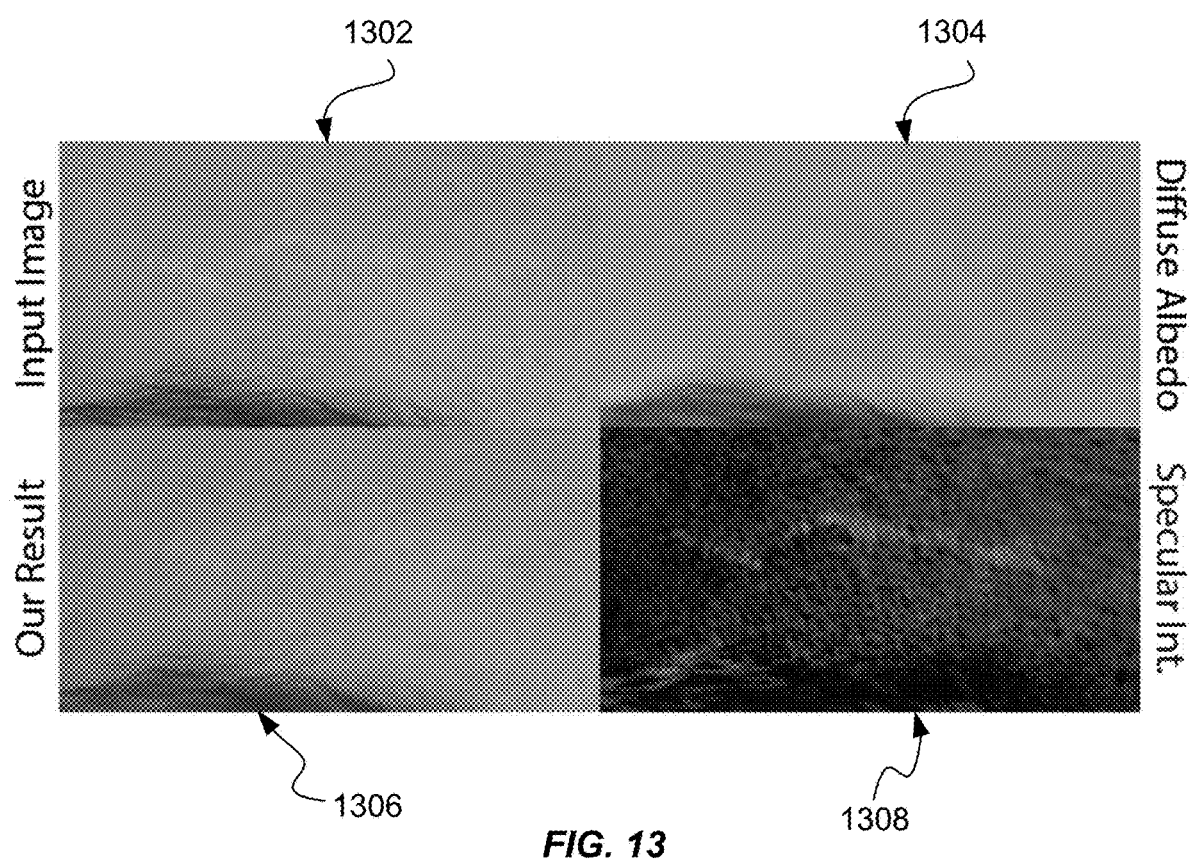
FIG. 13 shows exemplary modeling of a scar on a subject's forehead.

FIG. 13 shows exemplary modeling of a scar on a subject's forehead. Note that the result can be lacking a more elaborate sub-surface contribution, as the scope of this work is somewhat focused on surface reflection. This is akin to existing skin appearance acquisition used for visual effects. Nevertheless, the disclosed method can readily make use of simple approximate techniques for sub-subsurface scattering in texture space. A an input scar image 1302 shows a portion of a forehead above an eyebrow showing a scar. The rendered forehead image 1304 also reproduces the scar. A diffuse albedo image 1306 also shows an image of the scar although much less discernible that the input scar image 1302. In contrast, a specular intensity image 1308 highlights the scar.

Dynamic Appearance Rendering and Relighting

Figure 14:
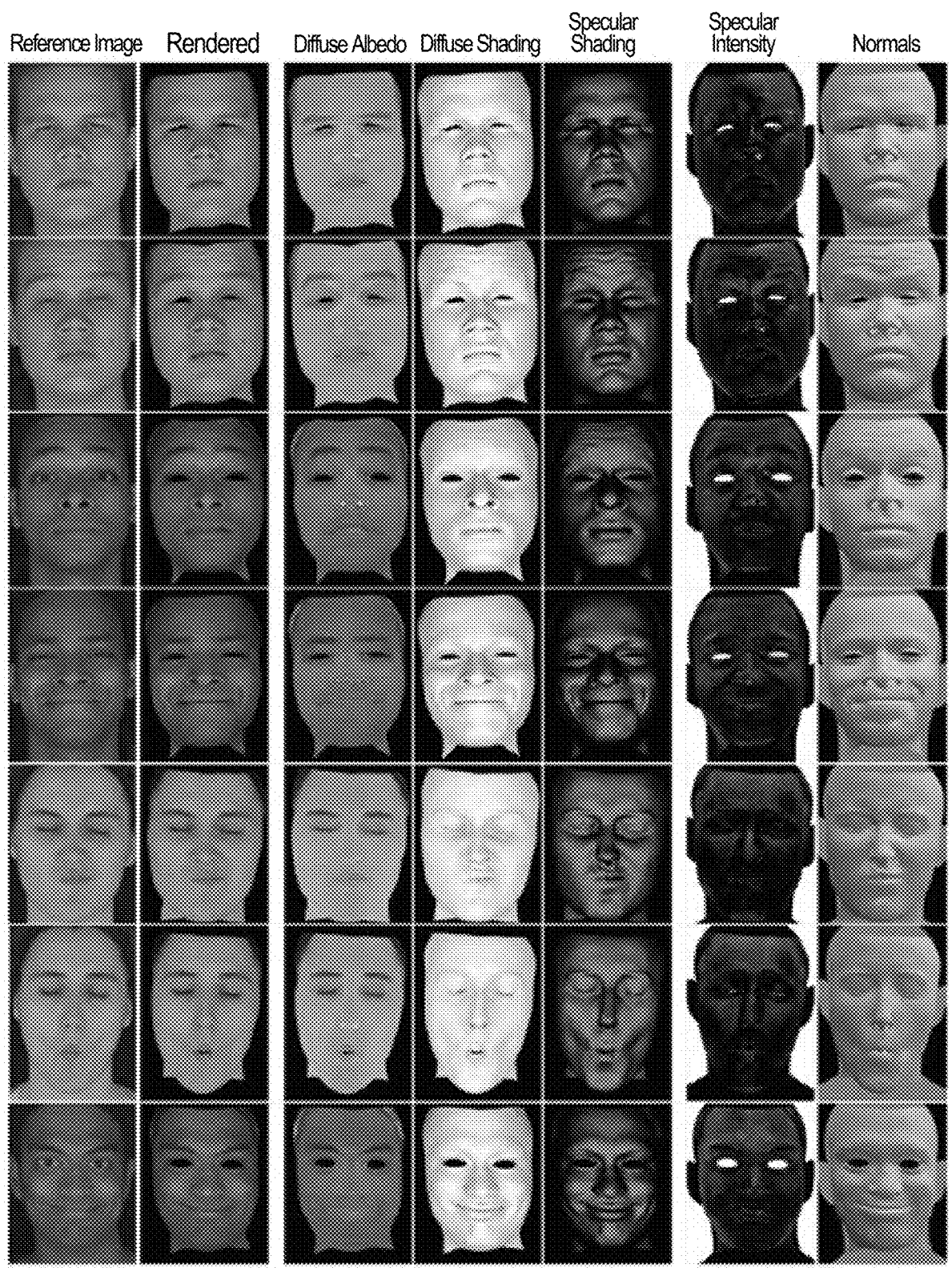
FIG. 14 shows exemplary rendering images by recovering dynamic albedo, dynamic ambient occlusion, dynamic specular intensity, as well as per frame normals for captured reference images.

FIG. 14 shows exemplary rendering images by recovering dynamic albedo, dynamic specular intensity and roughness, as well as per frame normals for captured reference images. The first column in FIG. 14 depicts multiple reference images showing different skin types and different facial expressions. The second column depicts a rendering using the disclosed techniques. The third column depicts a diffuse albedo map for each of the reference images. The fourth column depicts a diffuse shading map for each of the reference images. The fifth column depicts a specular shading image for each of the reference images. The sixth column depicts a specular intensity image for each of the reference images. The seventh column depicts a per-frame normals image for each of the reference images. The recovered maps can be used to create renders of the face with a high degree of realism as demonstrated. From the per-frame normal maps, diffuse surface shading (col. 4) can be computed using a Lambertian BRDF modulated by diffuse ambient occlusion, and specular surface shading (col. 5) can be computed using the Cook-Torrance model with a Blinn-Phong distribution. The final rendering can be computed by multiplying the diffuse shading with the dynamic albedo and adding the specular shading modulated by specular intensity (col. 6). The maps can be recovered by minimizing the difference of the render to the input image (col. 2).

The disclosed techniques present a practical approach for measurement based modeling of dynamic facial appearance. Unlike some previous works that have modeled appearance dynamics as a linear blend between a few acquired key poses, the disclosed techniques disclose a method that achieves truly dynamic appearance capture at video framerates of acquisition, and under standard uniform illumination setups that are commonly employed for facial performance capture. These techniques help bridge the gap in rendering fidelity for dynamic facial appearance acquired with passive acquisition compared to that achieved using specialized active illumination setups such as Light Stages. Given the constrained passive acquisition from a few viewpoints, robust fitting of the variability in diffuse albedo during a facial performance is made possible with the disclosed novel albedo subspace and a comprehensive set of constraints on appearance and geometry parameters.

However, given the constrained input, the techniques make a few simplifications to the overall dynamic facial appearance model. The techniques currently model the body (subsurface) reflection purely with a Lambertian BRDF and model only the albedo change during skin dynamics. Modeling parameter changes of a more sophisticated subsurface scattering model including modeling any change in spatially varying skin translucency, or explicit modeling of changes in melanin vs. hemoglobin concentrations might be required for increased realism for some applications. The technique's proposed albedo subspace can be based on the assumption of blood flow being the dominant factor for changes in albedo which is true for typical facial performances. However, the disclosed dynamic albedo model does not consider the effects of any change in melanin concentration or changes due to application of any cosmetics on skin. The technique's formulation for skin dynamics, while effective in anisotropically updating the surface normal, currently enforces the specular lobe (roughness) to remain isotropic. A more accurate modeling of skin appearance under deformation can additionally require anisotropic modeling of the specular BRDF under stretch and compression. The techniques can remain an important challenge for future work, as capturing the shape of specular lobe can be an ill-posed problem even in the static scenario with active illumination. Despite these current limitations, the disclosed techniques demonstrate high fidelity results with dynamic appearance changes for several subjects with different skin types which highlight the unprecedented capabilities of the proposed approach.

Figure 15:
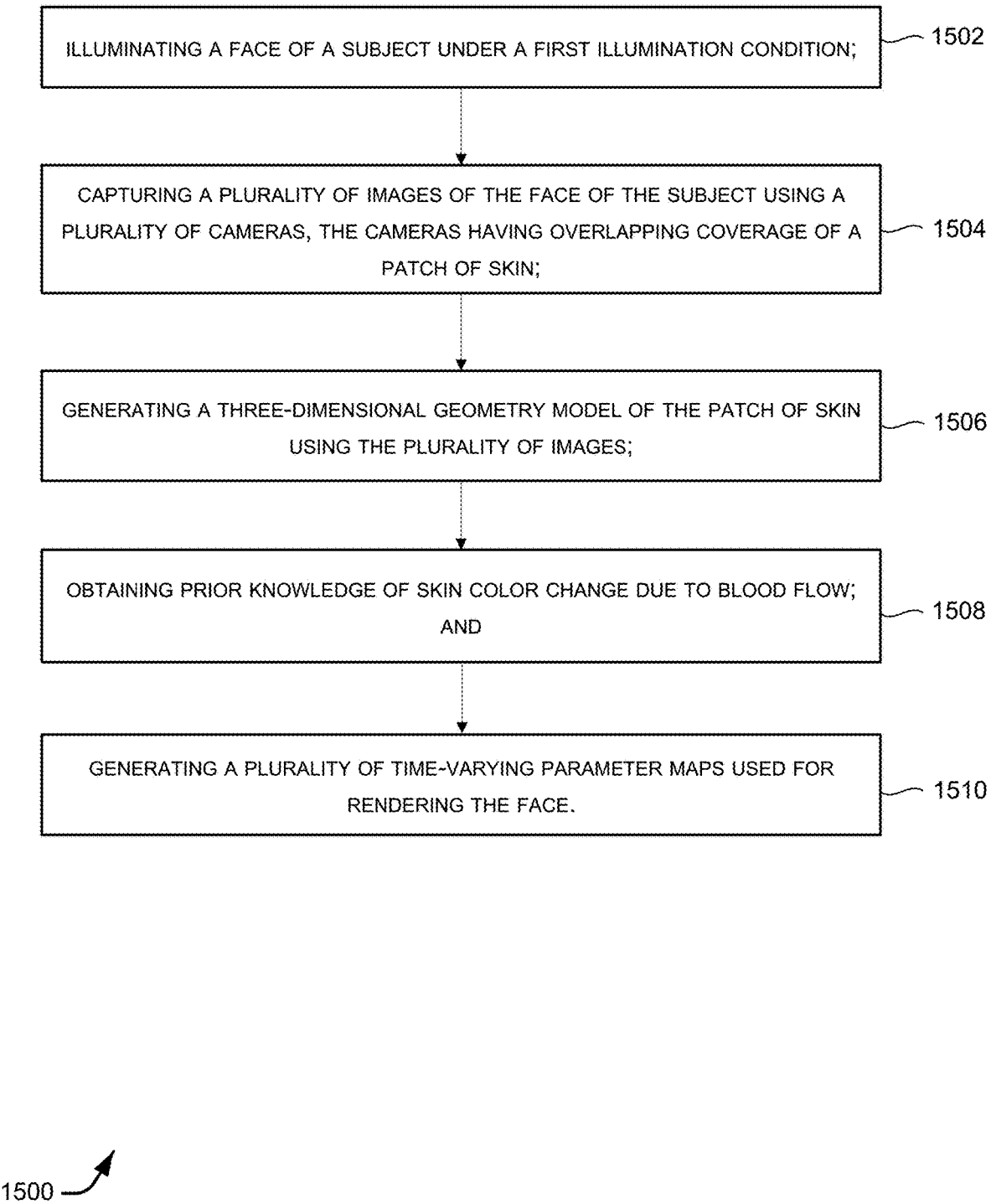
FIG. 15 shows exemplary flow diagram for the inverse rendering process for dynamic appearance of skin.

FIG. 15 shows exemplary flow diagram for the inverse rendering process for dynamic appearance of skin. A calibration process can be performed on the multiple cameras using one or more color charts. The calibration process can result in both geometrically and photometrically calibrated cameras. After each acquisition session, the techniques can capture a planar calibration target with fiducial markers for geometric calibration, plus an X-Rite COLORCHECKER® chart for photometric calibration of the acquired footage with respect to a linear sRGB color space. The calibration process can also be performed on the one or more light sources. The light calibration process can adjust the color of the light, the direction of the light, the brightness of the light and the illumination of the portion of the face by the lights.

Following calibration, the techniques determine the areas on the face each of the digital cameras cover. The techniques determine the illumination direction for illuminating each point of the face. The techniques can have a spherical illumination, from all possible directions illuminating each point on the face and determine which direction the light originates from. The techniques can also determine the brightness of the light.

At 1502, the techniques include illuminating a face of a subject under a first illumination condition. In various embodiments, the illumination can be accomplished by one or more portable light sources. The illumination can be provided by multiple light emitting diode (LED) light strips. In various embodiments, the illumination can be constant illumination. Alternatively, the techniques can be accomplished using temporary varying illumination by flickering the lights. For example, the technique can illuminate a left side first, followed by a right side, top side and bottom side. By temporarily changing the illumination provides different viewpoint lighting combinations. FIG. 3A depicts an embodiment for multiple LED light strips, but the configuration is exemplary and not one of limitation.

At 1504, the techniques include capturing multiple images of the face of the subject using multiple cameras. The cameras can be positioned to provide overlapping coverage of a patch of skin of the face of a user. Multiple cameras allow for triangulating the three-dimensional points on a face. FIG. 3A depicts an exemplary configuration for cameras for performing the disclosed techniques, however the techniques are not limited by this configuration. For example, the techniques can be performed using from two to twelve cameras. The number of cameras can vary to capture the different details of the skin. In various embodiments, the digital images are stored in computer readable medium on the multiple digital cameras. Alternatively, the images can be transmitted to a computing system via a frame grabber. In various embodiments, the digital camera can have processing algorithm on the camera for preprocessing of the results. In various embodiments, the digital cameras can be synchronized. If the digital cameras are not synchronized, the techniques can also be practiced if the light shifts or if the subject is either not moving or moving very slowly during capture.

At 1506, the techniques include generating a three-dimensional geometry model of the patch of skin using the plurality of images. In various embodiments, the three-dimensional geometry model can be stored in a memory. In some embodiments, the techniques can include generating texture maps of the patch of skin using the first plurality of images. In various embodiments, the texture maps can be high-resolution. The techniques can triangulate the depth of the subjects face and generate texture.

At 1508, the techniques can include obtaining prior knowledge of skin color change due to blood flow. The knowledge of skin color change can be looked up in a database of values, accessed from technical references, or using a model developed from another actor. In various embodiments, the knowledge of the skin color change can be obtained as follows. First, apply pressure firmly on the patch of skin. Next, release the pressure on the patch of skin. Next, capture a second plurality of images of the face of the subject using the plurality of cameras, the cameras having overlapping coverage of the patch of skin. Finally, compute a subject-specific blood flow line by aligning the second plurality of images of the patch of skin. In various embodiments, the pressure can be applied for only a few seconds. Applying pressure can cause the blood to leave the areas of the patch of skin where the pressure has been applied. By releasing the pressure on the patch of skin allows blood flow to return the affected area of skin. The albedo of the patch of skin and the rate of change of the albedo can be measured for developing a model for the skin. The techniques can include capturing a second set of multiple images of the face of the subject using multiple cameras. In various embodiments, the cameras can be positioned to provide overlapping coverage of the patch of skin. The digital cameras can be synchronized. The techniques can include computing a subject-specific blood flow line by aligning the second set of multiple images of the patch of skin. The subject-specific blood flow line can be calculate by measuring how much light is reflected on the surface of the skin. As the light is illuminated on the skin, some light is absorbed and reflected back underneath the surface of the skin changing the color of the reflected light. The techniques can resolve the normals at each location on the skin in order to capture the fine details on the skin (e.g., pores and wrinkles of the skin).

At 1510, the techniques include generating a plurality of the time-varying parameter maps used for rendering the face. In some embodiments, the face can be rendered under a second illumination condition. In some embodiments, the second illumination condition can be the same as the first illumination condition. In some embodiments it can be rendered under multiple illumination conditions. The time-varying appearance parameters can remove the shadows and capture the appearance parameters of the skin independent of the light and environmental conditions. For example, the technique can re-render the subject from another point of view and/or in a different environment (e.g., near a volcano with red light or in jungle with greenish light). These can be useful features for recreating the face of an actor in a game or a movie.

One of the time-varying maps can include an albedo map depicting time-varying blood flow of the patch of skin comprising a shading free color of the face. In various embodiments, the albedo map can use cross-polarized filters to remove direct specular reflection from the patch of skin. The albedo variation over time can be modeled as a one-dimensional curve in a color space code. The one-dimensional curve can be precomputed, leaving a single free parameter of a position along the curve to be estimated. In some embodiments, the albedo variation over time can be modeled as a straight line within a color space.

One of the plurality of time-varying parameter maps can include a specular intensity map. The specular intensity map can model light reflected off a surface of the patch of skin.

One of the time-varying maps can include a diffuse ambient occlusion map. The diffuse ambient occlusion map can capture residual diffuse shading that stems from a base mesh not capturing wrinkle folds of the face.

One of the time-varying maps can include a specular intensity map. The specular intensity map can models light reflected off a surface of the patch of skin.

One of the time-varying maps can include a dynamic normal map, the dynamic normal map captures geometric details of the patch of skin, as the patch of skin stretches or compresses. The geometric details can include details caused by pores or fine wrinkles.

The techniques can include creating renders of the face from the time-varying parameter maps by computing diffuse surface shading using a bidirectional reflection distribution function modulated by diffuse ambient occlusion. The technique can include computing specular surface shading using a Cook-Torrance model with Blinn-Phong distribution. The technique can include multiplying the diffuse surface shading with a dynamic albedo; and adding specular shading modulated by specular intensity.

The techniques can provide dynamic results, meaning the techniques can compute how the skin color changes because of blood flow. As the changes in skin albedo are measures over a small period of time, the change in albedo can be directly attributed to blood flow. When the subject makes an expression, the reflectance of the skin can change. The amount of light reflected from the skin can also be changed by wetting the lips or scratching the surface of the skin. The disclosed techniques can resolve this on such a fine scale on a per videoframe basis.

The technique allows for observing skin points independently. Observations of a point of skin can provide different color values because of the skin composition. The diffuse reflection of light can be the same from every viewpoint. However, specular reflection can be strongly viewpoint dependent. For example, observing an ordinary wall will look the same from many different viewpoints but observing an image in a mirror can be different depending on the viewpoint. The techniques can measure different color values from different observation points. The techniques can estimate the properties of appearance by creating a color value for the selected point on the face in order to re-render the color such that it corresponds to the real-world image.

The technique uses an inverse rendering approach. The technique generates a model for the skin appearance and recovers the reflection parameters of a bidirectional reflectance distribution function (BRDF) model. While the model selected is widely used for computer graphics, other models can be used with the disclosed technique. Given that appearance model, the technique optimizes in the parameter space to find the optimal appearance parameters. Albedo is one of the parameters the model optimizes. Albedo is the skin's intrinsic color, which is in the model set up for using (red-green-blue) RGB cameras and can result in an RGB value. However, the techniques can utilize a multi spectral acquisition that is not limited to the colors of red, green and blue. One constraint in the model is that albedo over time only changes due to blood flow. This can be true for periods of time of several hours. Specular intensity is a measure of how much light goes into the skin (and is then modulated by diffuse albedo) and how much light is reflected on the surface.

Normally the skin albedo produces a certain color and may not change much over time. The color base albedo is the static color of a neutral face. Throughout a capture, different facial expressions can dislocate the blood underneath the skin which can result in changes in skin color. These changes can be the result of varying concentrations of hemoglobin in the blood. Therefore, the albedo can have both a static component and a dynamic component that appears during facial expressions or changes in body temperature. The color space (albedo variation) can be represented along a line; the orientation for the line can be measured during the calibration stage. To determine the albedo the technique only requires one free parameter (scalar) to resolve the color without flickering of the light.

The temporal variation in skin albedo can be represented by a line within the International Commission on Illumination (CIE) Lab color space. While this subspace can be a more complex one dimensional curve it can be approximated by a straight line. In the various embodiments, changes in skin albedo can be represented in a one dimensional subspace within a color space code. The skin albedo can be measured by the diffuse reflection of light. Light arriving from a direction can hit the skin and can penetrate the skin. But as the skin is semi-translucent it can bounce many times, it can get absorbed and eventually it will exit the skin. If the light has bounced so many times as to lose directionality, there is no favorite direction exiting the skin. This results in light being re-emitted from the skin in all directions. That is how the techniques can model the skin component of diffuse reflection.

There can be another component of the light that when it hits the skin there is a percentage of light that is reflected about the normal of the skin. It can be reflected on the surface so it maintains the color of the light, there is no absorption of the red, green, or blue components of the light differently to maintain the color of the light. As the light can have a favorite preferred direction which is the reflected direction about the normal direction. That is why the techniques estimate the normal direction because it informs on how the surface component is being reflected and the preferred reflection direction. The amount of light reflected off the skin can be dependent on either moisture or oiliness characteristics of the skin.

Another characteristic can be measured is not only the percentage of the light that is reflected from the surface and the preferred direction but how much the light is concentrated in the preferred direction therefore calculating the size and the shape of the specular lobe.

Figure 16:
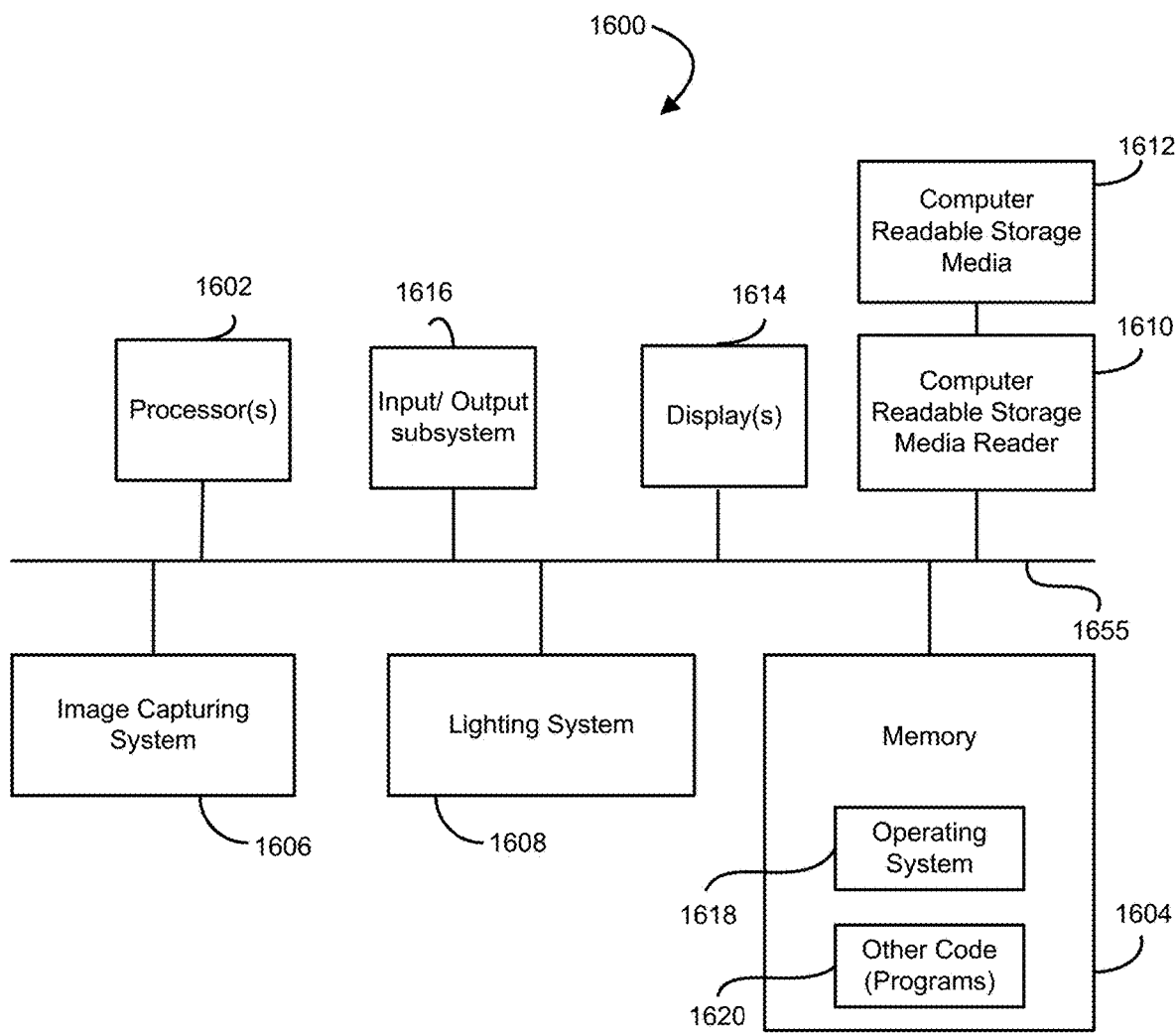
FIG. 16 illustrates an exemplary system diagram used for inverse rendering process for dynamic appearance of skin.

FIG. 16 illustrates an exemplary system 1600 block diagram for performing an inverse rendering process for dynamic appearance of skin. System 1600 can include but is not limited to several components including a computing system including one or more processors 1602, a memory 1604, an image capturing system 1606, a lighting system 1608, a computer readable medium reader 1610, a computer readable medium 1612, one or more displays 1614, and an input/output system 1616.

One or more processors 1602 run various software components stored in the computer-readable medium 1612 to perform various functions for the computing system. Processor(s) 1602 can be implemented as appropriate in hardware, software, or combinations thereof. Computer-executable instruction or firmware implementations of processor(s) 1602 can include computer-executable instructions written in any suitable programming language to perform the various functions described. In some embodiments, the software components include an operating system 1618 and other applications 1620 (or set of instructions).

A memory 1604 may store program instructions that are loadable and executable on processor(s) 1602, as well as data generated during the execution of these programs. Depending on the configuration and type of system 1600, memory 1602 can be volatile (such as random access memory (RAM)) and/or non-volatile (such as read-only memory (ROM), flash memory, etc.). The system 1600 can have one or more memories. The system 1600 can also include additional removable storage and/or non-removable storage including, but not limited to, magnetic storage, optical disks, and/or tape storage. The disk drives and their associated non-transitory computer-readable media may provide non-volatile storage of computer readable instructions, data structures, program modules, and other data for the devices. In some implementations, memory 1604 can include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

A image capturing system 1606 can include two or more digital cameras. The digital cameras can consist of a multi-view stereo-rig composed of a plurality of monochrome cameras (e.g., 12MP Ximea CB120MG cameras). The digital cameras can be arranged in stereo-pairs in order to cover the entire face of an actor, which are used to reconstruct the base three-dimensional (3D) model. In one non-limiting embodiment, the multi-view stereo-rig can include eight monochrome cameras arranged in four stereo-pairs. The techniques can interleave multiple additional color cameras (e.g., 20MP Ximea CB200CG), one between each stereo-pair, to record red-green-blue (RGB) color data for facial appearance estimation at a defined rate. In some embodiments the defined rate can be 30 frames per second. Other embodiments can include any number of cameras providing overlapping coverage of the skin of the face of an actor. Digital circuitry of the two or more digital cameras can capture a digital image and process the image into one or more digital assets that can be stored in a memory 1604 or computer readable medium 1612. The digital images from the digital cameras can be transmitted directly through one or more cables to the system 1600 via a frame grabber. Alternatively, the images can be stored on one or more computer readable medium 1612 and later transferred to the memory 1604 of the system 1600.

The system can include a lighting system 1608. The lighting system 1608 can illuminate the actor with constant white illumination provided by multiple light sources placed in front of the actor. In various embodiments, the multiple light sources can include 16 LED strips. The strips can be clustered to produce two horizontal and two vertical linear light sources, where the horizontal ones illuminate the face slightly from below and above and the vertical ones from each half-profile. The techniques can use varying illumination for the inversion process to obtain a detailed surface appearance when viewed from different viewpoints. It can be challenging for every camera to see exactly the same amount of reflection from lights. The lighting arrangement disclosed herein are one possible arrangement and may not be the optimum arrangement. The techniques have employed different light arrangements where the light is uniform and distributed again. Other arrangements include those with the light sources in front of the actor and the techniques have achieved similar results. Various arrangements can also use point lights or smaller area lights.

In some embodiments, a computer readable medium reader 1610 can engage with one or more computer readable medium 1612. The computer readable medium reader 1610 can transfer one or more digital assets from computer readable medium 1612 to the memory 1602 of the system 1600.

Computer readable medium 1612 and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Computer-readable medium 1612 or memory and additional storage are both examples of non-transitory computer storage media. Additional types of computer storage media that may be present in device 1700 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by system 1600. Combinations of any of the above should also be included within the scope of non-transitory computer-readable storage media. Based on the disclosure and teachings provided herein, a person of ordinary skill in the art can appreciate other ways and/or methods to implement the various embodiments. However, as noted above, computer-readable storage media does not include transitory media such as carrier waves or the like.

The system 1600 can incorporate a display 1614. The display 1614 can be a liquid crystal display (LCD), organic light emitting diode (OLED), active-matrix organic light-emitting diode (AMOLED), Super AMOLED, thin-film transistor (TFT), in-plane switching (IPS), or TFT-LCD that typically can be found a computing device. The display 1614 can incorporate a touchscreen display. In some embodiments, the display 1614 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in the computer-readable medium 1702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

In some embodiments, I/O subsystem 1616 can include a user input devices such as a keyboard, mouse, and/or track pad. The I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, the system 1600 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other devices such as network input/output devices may be employed.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for acquiring dynamic properties of facial skin, the method comprising:
    illuminating a face of a subject under a first illumination condition;
    capturing a plurality of images of a portion of the face of the subject using a plurality of cameras, the cameras having overlapping coverage of a patch of skin;
    generating a three-dimensional geometry model of the patch of skin using the plurality of images;
    applying pressure firmly on the patch of skin;
    releasing the pressure on the patch of skin;
    capturing a second plurality of images of the face of the subject over time; and
    computing a subject-specific blood flow curve from the second plurality of images of the patch of skin; and
    generating a plurality of time-varying parameter maps using the subject-specific blood flow curve for rendering the face of the subject.

2. The method of claim 1, wherein one of the plurality of time-varying parameter maps includes an albedo map created with cross-polarized filters that remove direct specular reflection from the patch of skin, the albedo map contains time-varying blood flow of the patch of skin.

3. The method of claim 2, wherein albedo variation over time is modeled as a one-dimensional curve in a color space code.

4. The method of claim 3, wherein albedo variation over time is modeled as a straight line within a color space.

5. The method of claim 4, wherein an International Commission on Illumination (CIE) Lab color space is used as the color space.

6. The method of claim 3, wherein the one-dimensional curve is precomputed, leaving a single free parameter of a position along the curve to be estimated.

7. The method of claim 1, wherein one of the plurality of time-varying parameter maps includes a specular intensity map, the specular intensity map models light reflected off a surface of the patch of skin.

8. The method of claim 1, wherein one of the plurality of time-varying parameter maps includes a diffuse ambient occlusion map capturing residual diffuse shading capturing wrinkle folds of the face.

9. The method of claim 1, wherein one of the plurality of time-varying parameter maps includes a normal map, the normal map captures geometric details of the patch of skin as the patch of skin stretches or compresses.

10. The method of claim 9, wherein the geometric details include details caused by pores or fine wrinkles.

11. A non-transitory, computer-readable medium comprising instructions that, when executed by one or more processors, cause the one or more processors to perform operations comprising:
    illuminating a face of a subject under a first illumination condition;
    capturing a plurality of images of a portion of the face of the subject using a plurality of cameras, the cameras having overlapping coverage of a patch of skin;
    generating a three-dimensional geometry model of the patch of skin using the plurality of images;
    applying pressure firmly on the patch of skin;
    releasing the pressure on the patch of skin;
    capturing a second plurality of images of the face of the subject over time; and
    computing a subject-specific blood flow curve from the second plurality of images of the patch of skin; and
    generating a plurality of time-varying parameter maps using the subject-specific blood flow curve for rendering the face of the subject.

12. The non-transitory, computer-readable medium of claim 11, wherein one of the plurality of time-varying parameter maps includes an albedo map created with cross-polarized filters that remove direct specular reflection from the patch of skin, the albedo map contains time-varying blood flow of the patch of skin.

13. The non-transitory, computer-readable medium of claim 11, wherein one of the plurality of time-varying parameter maps includes a specular intensity map, the specular intensity map models light reflected off a surface of the patch of skin.

14. The non-transitory, computer-readable medium of claim 11, wherein one of the plurality of time-varying parameter maps includes a diffuse ambient occlusion map capturing residual diffuse shading capturing wrinkle folds of the face.

15. The non-transitory, computer-readable medium of claim 11, wherein one of the plurality of time-varying parameter maps includes a normal map, the normal map captures geometric details of the patch of skin as the patch of skin stretches or compresses.

16. The non-transitory, computer-readable medium of claim 15, wherein the geometric details include details caused by pores or fine wrinkles.

17. A system for acquiring dynamic properties of facial skin, the system comprising:

a multi-view stereo-rig comprised of a plurality of cameras arranged for overlapping coverage of a face of a subject;
a plurality of light sources arranged to illuminate the subject with a first illumination condition;
one or more processors;
a computer-readable memory coupled to the one or more processors, the computer-readable memory storing instructions that cause the one or more processors to:
  capture a plurality of images of the face of the subject using a plurality of cameras, the cameras having overlapping coverage of a patch of skin;
  generate a three-dimensional geometry model of the patch of skin using the plurality of images;
  apply pressure firmly on the patch of skin;
  release the pressure on the patch of skin;
  capture a second plurality of images of the face of the subject over time; and
  compute a subject-specific blood flow curve from the second plurality of images of the patch of skin; and
  generate a plurality of time-varying parameter maps using the subject-specific blood flow curve for rendering the face of the subject.

18. The system of claim 17, wherein the plurality of cameras are comprised of cameras arranged in stereo-pairs to cover the face of the subject.

19. The system of claim 18, further comprising a plurality of color cameras interleaved between each stereo-pair of cameras to record red-green-blue color data for facial appearance at a predetermined rate.

20. The system of claim 17, wherein the plurality of light sources comprise LED strips clustered to produce two horizontal light sources and two vertical linear light sources, wherein the horizontal light sources illuminate the face from below and the vertical linear light sources illuminate the face from each half-profile.

21. The system of claim 17, further comprising a high dynamic range light probe to model an incident illumination level of a surrounding environment.

22. The system of claim 17, further comprising:
  a planar calibration target with fiducial markers for geometric calibration; and
  a color checker chart for photometric calibration of acquired footage with respect to a liner sRGB color space.

* * * * *